United States Patent
Aoyagi et al.

(10) Patent No.: US 7,512,309 B2
(45) Date of Patent: Mar. 31, 2009

(54) POLYMER COMPOSITION, PLASTIC OPTICAL FIBER, PLASTIC OPTICAL FIBER CABLE, AND METHOD FOR MANUFACTURING PLASTIC OPTICAL FIBER

(75) Inventors: Amane Aoyagi, Otake (JP); Yoshihiro Tsukamoto, Otake (JP); Keiji Iwasaka, Otake (JP); Keiichi Sakashita, Otake (JP)

(73) Assignee: Mitsubishi Rayon Co, Ltd., Tokyo (JP)

( * ) Notice: Subject to any disclaimer, the term of this patent is extended or adjusted under 35 U.S.C. 154(b) by 0 days.

(21) Appl. No.: 11/794,313

(22) PCT Filed: Dec. 27, 2005

(86) PCT No.: PCT/JP2005/023939

§ 371 (c)(1),
(2), (4) Date: Jun. 27, 2007

(87) PCT Pub. No.: WO2006/070824

PCT Pub. Date: Jul. 6, 2006

(65) Prior Publication Data

US 2008/0166091 A1    Jul. 10, 2008

(30) Foreign Application Priority Data

Dec. 27, 2004 (JP) .............................. 2004-377186
Mar. 15, 2005 (JP) .............................. 2005-073121
Sep. 6, 2005 (JP) .............................. 2005-258279

(51) Int. Cl.
*G02B 6/00* (2006.01)

(52) U.S. Cl. ...................... 385/145; 385/143

(58) Field of Classification Search ................... 385/145
See application file for complete search history.

(56) References Cited

U.S. PATENT DOCUMENTS

| | | | |
|---|---|---|---|
| 5,880,235 A | 3/1999 | Schwind et al. | |
| 2005/0074216 A1 | 4/2005 | Irie | |

FOREIGN PATENT DOCUMENTS

| | | |
|---|---|---|
| JP | 63-74010 A | 4/1988 |
| JP | 63-163306 A | 7/1988 |
| JP | 4-365003 A | 12/1992 |
| JP | 6-200004 A | 7/1994 |
| JP | 6-200005 A | 7/1994 |
| JP | A 8-231648 A | 9/1996 |
| JP | 9-12641 A | 1/1997 |
| JP | 9-12646 A | 1/1997 |
| JP | 9-33735 A | 2/1997 |
| JP | 9 33736 A | 2/1997 |
| JP | 9-304635 A | 11/1997 |
| JP | 2001-174647 A | 6/2001 |
| JP | 2002-202415 A | 7/2002 |
| JP | 2005-330462 A | 12/2005 |
| JP | 2006-11161 A | 1/2006 |

OTHER PUBLICATIONS

Ohtsuka et al., "Light Scattering and Local Structure in Low-Loss Poly(methyl methacrylate) Glasses," Kobunshi Ronbunshu, vol. 42, No. 2, 1985, pp. 265-271.

Tanio et al., "Light Scattering Loss and Glass Temperature of Optical Polymer Glass," Kobunshi Ronbunshu, vol. 53, No. 10, 1996, pp. 682-688.

Pittman et al., "Radical-Initiated Polymerization of β-methyl-α-methylene-Y-butyrolactone," Journal of Polymer Science, vol. 41, No. 12, Jun. 15, 2003, pp. 1759-1777.

Akkapeddi, "The Free Radical Copolymerization Characteristics of α-methylene-Y-butyrolactone," Polymer, vol. 20, 1979, pp. 1215-1216.

Tanaka, Summary proceedings of 8th POF Consortium, POF Consortium, Apr. 26, 1995, pp. 7-15.

*Primary Examiner*—Sung H Pak
(74) *Attorney, Agent, or Firm*—Fitch, Even, Tabin & Flannery

(57) ABSTRACT

There is provided a polymer composition comprising 5 to 100% by mass of a unit (A) of a lactone compound represented by a general formula (1) and 0 to 95% by mass of a unit (B) of (meth)acrylate as constitutional units, wherein the unit (A) of a lactone compound comprises a unit of an (S) isomer represented by a general formula (2) and a unit of an (R) isomer represented by a general formula (3) at a mass ratio of from 70/30 to 30/70; and wherein the polymer composition has a total light scattering loss of not more than 100 dB/km. The polymer composition is excellent in heat resistance and transparency.

14 Claims, No Drawings

POLYMER COMPOSITION, PLASTIC OPTICAL FIBER, PLASTIC OPTICAL FIBER CABLE, AND METHOD FOR MANUFACTURING PLASTIC OPTICAL FIBER

This Application is the U.S. National Stage Application under 35 U.S.C. 371 of International Application PCT/JP/2005/023939 filed Dec. 27, 2005 which claims benefit from Japanese patent application number 2004-377186 filed Dec. 27, 2004, Japanese patent application number 2004-073121 filed Mar. 15, 2005 and Japanese patent application number 2005-258279 filed Sep. 6, 2005, the complete disclosures of which are incorporated herein by reference.

TECHNICAL FIELD

The present invention relates to a polymer composition excellent in transparency and heat resistance, a plastic optical fiber, a plastic optical fiber cable, and a method for manufacturing plastic optical fiber.

BACKGROUND ART

Plastic optical fibers (POF) are in practical use in lighting applications, sensors for FA, or media for transmission of information in the communications industry by taking advantages of POFs such as low cost, lightweight, flexibility, and large diameter. As core material of POFs, a polymethyl methacrylate (PMMA) resin having sufficient mechanical strength and transmission characteristics is used as a main component.

As for POF using PMMA as a core material, because PMMA has a glass transition temperature (Tg) of about 110° C., the POF can be used actually under temperatures of the upper limit of about 110° C. even when the outside of the POF is coated with a polymer having a higher heat resistance. Therefore, in applications that requires higher heat resistance, it has been attempted to use materials having higher heat resistance than PMMA as core material. Specifically, POFs have been proposed which contain any of the following various materials as core material: polycarbonate resins described in Patent Document 1 or Patent Document 2; or amorphous polyolefin resins having alicyclic groups with high heat resistance as main chains described in Patent Document 3, Patent Document 4, or Non-Patent Document 1.

However, when POFs with polycarbonate resins (PC resins) as core material are to be produced, it is difficult to purify the core materials and remove foreign matters and the like. These POFs further have large light scattering loss due to ununiformity of density of the polymers themselves. Therefore, POFs with PC resins as core material is much inferior in transmission characteristics (transmission loss: equal to or more than 500 dB/km) to POFs with PMMA as core material (transmission loss: 130 dB/km). In addition, homopolymers or copolymers of alkyl fluoride (meth)acrylates or polymers containing fluorinated ethylene, which are widely used as cladding materials for POFs, have low adhesion to polycarbonates. Therefore, POFs with polycarbonate as core material tend to cause structural changes such as separation at the core-clad interfaces.

In addition, polymers having alicyclic groups in the main chains commercially available from several companies for core materials of POFs are difficult to purify. POFs using the polymers as core material have suffered from problems such as inferior transmission characteristics, low adhesion between the core and the clad, or the like as well as the POFs with polycarbonate resins as core material.

Meanwhile, in Patent Document 5 and Patent Document 6, POFs having relatively good transmission characteristics are proposed in which copolymers of methacrylate having alicyclic groups as side chains such as bornyl methacrylate, adamantyl methacrylate or tricyclodecanyl methacrylate and methylmethacrylate (MMA) are used as core material.

However, as to POFs in which polymers having monomer units of (meth)acrylates having common alicyclic groups as side chains are used as core material, the alicyclic groups of the polymers tend to decompose and leave at/from sites of ester bonds when the polymers of the core materials pass through high temperature units maintained at 200° C. or higher such as extruders or nozzles. Therefore, such POFs have a problem that the polymers cause heat deterioration when the polymers are melted and formed, thereby deteriorating transmission characteristics. In addition, improvements of the POFs thus manufactured are demanded in terms of heat resistance.

Recently, in Patent Document 8 and Patent Document 9, POFs with homopolymers or copolymers as core material have been proposed where the homopolymers are produced from α-methylene-γ-butyrolactone derivatives, respectively, which provide the POFs with a good balance between transparency and heat resistance such as high glass transition temperature or resistance to thermal decomposition, such as α-methylene-γ-methyl-γ-butyrolactone, α-methylene-γ,γ-methyl-γ-butyrolactone, α-methylene-γ-ethyl-γ-butyrolactone, or α-methylene-β-methyl-γ-butyrolactone, and the copolymers are produced from these monomers and methacrylate monomers.

However, the homopolymers of α-methylene-γ-butyrolactone derivatives and the copolymers of the α-methylene-γ-butyrolactone derivatives and methacrylate monomers described in the documents do not have sufficient transparency for core materials of POFs. In addition, in order to make the copolymers to have glass transition temperatures as high as those of polycarbonates, it is necessary to copolymerize α-methylene-γ-butyrolactone derivative units to account for about 50% by mass of the copolymers. Therefore, the resulting copolymers have a problem of having a low mechanical strengths.

Furthermore, in Patent Document 7, it is reported that homopolymers of α-methylene-β-methyl-γ-butyrolactone or α-methylene-β-ethyl-γ-butyrolactone, copolymers derived from monomers of α-methylene-β-methyl-γ-butyrolactone, or α-methylene-β-ethyl-γ-butyrolactone and monomers of methacrylates are applicable to core materials for optical waveguides because the homopolymers and the copolymers have higher glass transition temperatures than PMMA, excellent transparency (light transmittance) and high indexes of refraction. However, performance of the homopolymers and the copolymers as POFs are not verified actually.

In general, in copolymerization system of an α-methylene-γ-butyrolactone derivative and a methacrylate monomer these monomers have a large difference of reactivity ratio which tends to produce block copolymers as described in Non-Patent Document 2 and Non-Patent Document 3. Furthermore, if there is a large difference in refraction index between the α-methylene-γ-butyrolactone derivative and the methacrylate monomer, such a copolymer will have a light scattering loss much larger than PMMA resins which are commonly used as core material of POFs. Therefore, it will not be easy to use the copolymer as core material of POFs or as transparent optical material as it is.

As for techniques for reducing light scattering loss of polymers, a technique of thermally melting PMMA has been reported as described in Non-Patent Document 4 and Non- Patent Document 5. However, this technique is applied to homopolymers and there is no known example in which use of this technique sufficiently reduces light scattering loss of the copolymers having a strong tendency of block copolymers or the copolymers having large difference of indexes of refraction between constituent monomers, and these copolymers are put to actual use as core material of POFs.

Patent Document 1: Japanese Patent Laid-Open No. 06-200004
Patent Document 2: Japanese Patent Laid-Open No. 06-200005
Patent Document 3: Japanese Patent Laid-Open No. 04-365003
Patent Document 4: Japanese Patent Laid-Open No. 2001-174647
Patent Document 5: Japanese Patent Laid-Open No. 63-74010
Patent Document 6: Japanese Patent Laid-Open No. 63-163306
Patent Document 7: Japanese Patent Laid-Open No. 08-231648
Patent Document 8: Japanese Patent Laid-Open No. 09-033735
Patent Document 9: Japanese Patent Laid-Open No. 09-033736
Non-Patent Document 1: Akira Tanaka, summary proceedings of 8th POF Consortium, POF Consortium, Apr. 26, 1995, p. 7 to 15
Non-Patent Document 2: Polymer, Vol. 21, 1215 to 1216 (1979)
Non-Patent Document 3: Journal of Polymer Science: Part A: Polymer chemistry, Vol. 41, 1759 to 1777 (2003)
Non-Patent Document 4: Japanese journal of polymer science and technology, Vol. 42, No. 4, 265 to 271 (1985)
Non-Patent Document 5: Japanese journal of polymer science and technology, Vol. 53, No. 10, 682 to 688 (1996)

DISCLOSURE OF THE INVENTION

A subject of the present invention is to provide a polymer composition excellent in heat resistance and transparency, a plastic optical fiber and a plastic optical fiber cable comprising the polymer composition, and a method for manufacturing a plastic optical fiber excellent in heat resistance and transparency.

The present inventors have found that shaped articles of a homopolymer of α-methylene-β-methyl-γ-butyrolactone or α-methylene-β-ethyl-γ-butyrolactone, which has a substituent at β-position, can be opaque. The inventors also have found that, in shaped articles of a copolymer of such a lactone, and a methacrylate, the higher the content of the lactone compound becomes, the higher the light scattering loss becomes far beyond the level of light scattering loss required for optical fibers or optical waveguides even if the shaped articles are transparent in appearance. The inventors have focused attention on this problem and have found that (co)polymers of lactone compounds and (meth)acrylates tend to have increased light scattering loss when a unit of the lactone compounds consists solely of an S-isomer unit or an R-isomer unit. The inventors have obtained findings that polymers comprising the isomer units in a specific range make it possible to prevent light scattering loss from increasing, maintain high transparency and enhance heat treatment. The inventors have accomplished the present invention based on the findings.

That is, the present invention relates to a polymer composition comprising 5 to 100% by mass of a unit (A) of a lactone compound represented by a general formula (1) and 0 to 95% by mass of a unit (B) of a (meth)acrylate as constitutional units, wherein the unit (A) of a lactone compound comprises a unit of an (S) isomer represented by a general formula (2) and a unit of an (R) isomer represented by a general formula (3) at a mass ratio of from 70/30 to 30/70; and wherein the polymer composition has a total light scattering loss of not more than 100 dB/km,

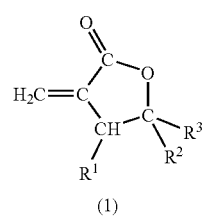

[Formula 1]

(1)

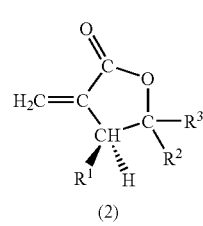

[Formula 2]

(2)

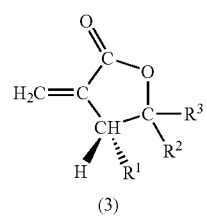

[Formula 3]

(3)

wherein, in the formulae (1) to (3), $R^1$ represents a methyl group, an ethyl group, or a propyl group; and $R^2$ and $R^3$ independently represent a hydrogen atom, a $C_{1-12}$ alkyl group that may be unsubstituted or substituted with one or more than two fluorine atoms, a phenyl group that may be unsubstituted or substituted with one or more than two alkyl groups, or a cyclohexyl group that may be unsubstituted or substituted with one or more than two fluorine atoms, or alternatively $R^2$ and $R^3$ may unite each other to form a 5- or 6-membered ring including the carbon atom to which $R^2$ and $R^3$ are bonded, where the 5- or 6-membered ring may be substituted with one or more than two fluorine atoms.

In addition, the present invention relates to a plastic optical fiber characterized in that the fiber has a transmission loss not more than 400 dB/km and a core of a polymer composition comprising 5 to 100% by mass of a unit (A) of a lactone compound represented by a general formula (1) and 0 to 95% by mass of a unit (B) of a (meth)acrylate as constitutional units, wherein the unit (A) of lactone compound comprises a unit of an (S) isomer represented by a general formula (2) and a unit of an (R) isomer represented by a general formula (3) at a mass ratio of from 70/30 to 30/70,

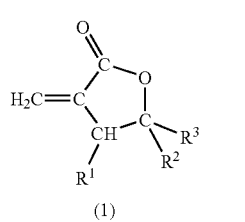

(1)

[Formula 4]

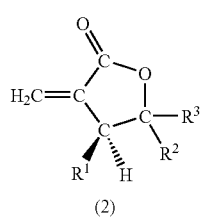

(2)

[Formula 5]

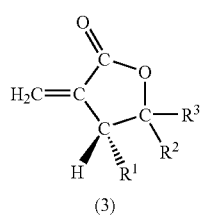

(3)

[Formula 6]

wherein, in the formulae (1) to (3), R¹ represents a methyl group, an ethyl group, or a propyl group; and R² and R³ independently represent a hydrogen atom, a $C_{1-12}$ alkyl group that may be unsubstituted or substituted with one or more than two fluorine atoms, a phenyl group that may be unsubstituted or substituted with one or more than two alkyl groups, or a cyclohexyl group that may be unsubstituted or substituted with one or more than two fluorine atoms, or alternatively R² and R³ may unite each other to form a 5- or 6-membered ring including the carbon atom to which R² and R³ are bonded, where the 5- or 6-membered ring may be substituted with one or more than two fluorine atoms.

The present invention also relates to a plastic optical fiber cable characterized by comprising a coating layer comprising a thermoplastic resin on the outer periphery of the plastic optical fiber described above.

In addition, the present invention relates to a method for manufacturing a polymer composition characterized by polymerizing a mixture of monomers comprising 5 to 100% by mass of a lactone compound (A) represented by a general formula (1) comprising an (S) isomer represented by a general formula (2) and an (R) isomer represented by a general formula (3) at a mass ratio of from 70/30 to 30/70, and 0 to 95% by mass of a (meth)acrylate (B) so that the mixture has a polymer content equal to or greater than 94%; and then subjecting the mixture to thermal melting under conditions of a temperature of Tc° C. (Tc≧Tg+40) (Tg denotes a glass transition temperature of the polymer composition) and of a pressure equal to or greater than 0.6 MPa,

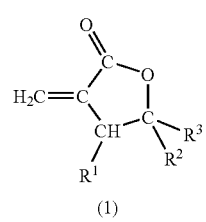

(1)

[Formula 7]

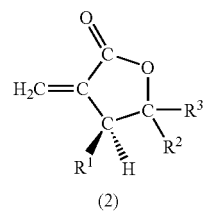

(2)

[Formula 8]

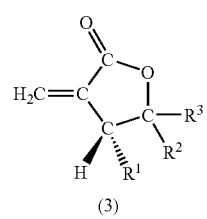

(3)

[Formula 9]

wherein, in the formulae (1) to (3), R¹ represents a methyl group, a an ethyl group, or a propyl group; and R² and R³ independently represent a hydrogen atom, a $C_{1-12}$ alkyl group that may be unsubstituted or substituted with one or more than two fluorine atoms, a phenyl group that may be unsubstituted or substituted with one or more than two alkyl groups, or a cyclohexyl group that may be unsubstituted or substituted with one or more than two fluorine atoms, or alternatively R² and R³ may unite each other to form a 5- or 6-membered ring including the carbon atom to which R² and R³ are bonded, where the 5- or 6-membered ring may be substituted with one or more than two fluorine atoms.

In addition, the present invention relates to a method for manufacturing a plastic optical fiber characterized by subjecting a core to thermal melting under conditions of a temperature of Tc° C. (Tc≧Tg+40) (Tg denotes a glass transition temperature of a polymer composition) and of a pressure equal to or greater than 0.6 MPa wherein the core is formed of the polymer composition obtained by polymerizing a mixture of monomers comprising 5 to 100% by mass of a lactone compound (A) represented by a general formula (1) comprising an (S) isomer represented by a general formula (2) and an (R) isomer represented by a general formula (3) at a mass ratio of from 70/30 to 30/70, and 0 to 95% by mass of a (meth)acrylate (B) so that the mixture has a polymer content equal to or greater than 94%.

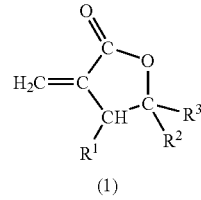

(1)

[Formula 10]

-continued

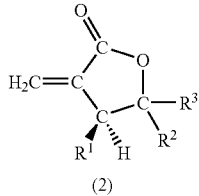

(2)

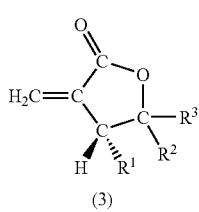

(3)

The polymer composition according to the present invention is excellent in heat resistance and transparency. The plastic optical fiber and the plastic optical fiber cable that use the polymer composition according to the present invention are excellent in heat resistance, have reduced transmission loss and are excellent in transmission characteristics.

BEST MODE FOR CARRYING OUT THE INVENTION

The polymer composition according to the present invention is characterized by comprising 5 to 100% by mass of a unit (A) of a lactone compound represented by a general formula (1) and 0 to 95% by mass of a unit (B) of (meth)acrylate as constitutional units, wherein the unit of a lactone compound comprises a unit of an (S) isomer represented by a general formula (2) and a unit of an (R) isomer represented by a general formula (3) at a mass ratio of from 70/30 to 30/70; and wherein the polymer composition has a total light scattering loss of not more than 100 dB/km,

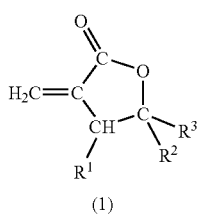

(1)

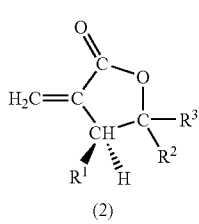

(2)

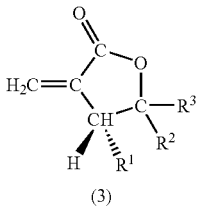

(3)

wherein, in the formulae (1) to (3), $R^1$ represents a methyl group, an ethyl group, or a propyl group; and $R^2$ and $R^3$ independently represent a hydrogen atom, a $C_{1-12}$ alkyl group that may be unsubstituted or substituted with one or more than two fluorine atoms, a phenyl group that may be unsubstituted or substituted with one or more than two alkyl groups, or a cyclohexyl group that may be unsubstituted or substituted with one or more than two fluorine atoms, or alternatively $R^2$ and $R^3$ may unite each other to form a 5- or 6-membered ring including the carbon atom to which $R^2$ and $R^3$ are bonded, where the 5- or 6-membered ring may be substituted with one or more than two fluorine atoms.

A lactone compound as the unit (A) of lactone compound is characterized by being an α-methylene-γ-butyrolactone derivative and having a structure of the substituent $R^1$ at the β position. α-methylene-γ-butyrolactone is a lactone compound of a 5-membered ring structure having a methylene group at the α position. As for its structure, a carbon atom at the α position bonds to a carbon atom of a methyl group bonded by an ester bond in methylmethacrylate, thereby providing the cyclic structure.

A polymer compositions comprising as its unit a lactone compound of another structural type that does not have any substituent structure at the β position and does have a substituent(s) only at the γ position, such as α-methylene-γ-methyl-γ-butyrolactone, or α-methylene-γ,γ-dimethyl-γ-butyrolactone, has a large light scattering loss. Therefore, such a polymer composition is not suitable as core material of POFs. However, the structure of having a substituent at the β position prevents light scattering loss from increasing in a polymer, whereby extremely high transparency can be maintained.

Furthermore, the structure having a substituent at the β position restricts rotational movement of the main chain of the polymer, whereby heat resistance (glass transition temperature) of the polymer can be remarkably increased as compared with a lactone compound of another structural type that has a substituent(s) at the γ position such as α-methylene-γ-methyl-γ-butyrolactone, or α-methylene-γ,γ-dimethyl-γ-butyrolactone. The structurally bulkier the substituent $R^1$ at the β position becomes, the lower the polymerizability on copolymerization, thereby deteriorating heat resistance of the resulting polymer. Therefore, the substituent $R^1$ at the β position is selected from a methyl group, an ethyl group, and a propyl group.

The lactone compound represented by the general formula (1) may not have a substituent at the γ position. In the formula, $R^2$ and $R^3$ may independently represent a hydrogen atom, a $C_{1-12}$ alkyl group that may be unsubstituted or substituted with one or more than two fluorine atoms, a phenyl group that may be unsubstituted or substituted with one or more than two alkyl groups, or a cyclohexyl group that may be unsubstituted or substituted with one or more than two fluorine atoms. $R^2$ and $R^3$ may unite each other to form a 5- or 6-membered ring including the carbon atom to which $R^2$ and $R^3$ are bonded, where the 5- or 6-membered ring may be substituted with one or more than two fluorine atoms. The $C_{1-12}$ alkyl group is represented by CnH2n+1 (n represents a natural number of 1 to 12). The $C_{1-12}$ alkyl group may have a linear shape or a branched shape. The fluorine-containing $C_{1-12}$ alkyl group is represented by Cn Fm H2n+1−m (n represents a natural number of 1 to 12, and m represents a natural number equal to or less than 2n+1). The fluorine-containing $C_{1-12}$ alkyl group may have a linear shape or a branched shape. In addition, carbon atoms in main chains of $R^2$ and $R^3$ may be substituted with one or more than two heteroatoms of S, N, or P, or one or more than two O atoms.

Furthermore, the unit (A) of lactone compound has a structure of the substituent $R^1$ at the β position and also comprises a unit of an (S) isomer represented by the general formula (2) and a unit of an (R) isomer represented by the general formula (3) at a mass ratio of from 30/70 to 70/30. The unit of lactone compound represented by the general formula (1) comprises the unit of the (S) isomer represented by the general formula (2) and the unit of the (R) isomer represented by the general formula (3) in the above ratio, whereby the polymer composition has extremely high transparency even under high temperature environment, and POFs using the polymer composition can maintain low transmission loss with stability. Because even higher transparency can be maintained, the unit of the lactone compound represented by the general formula (1) preferably comprises the unit of the (S) isomer represented by the general formula (2) and the unit of the (R) isomer represented by the general formula (3) in a ratio of from 40/60 to 60/40, and more preferably in a ratio of from 45/55 to 55/45.

When either the unit of the (S) isomer or the unit of the (R) isomer included in the unit (A) of the lactone compound exceeds 70% by mass, the polymer has reduced transparency, and such a polymer is not preferable to be used as a core material for POF. In particular, when the polymer consists of only the (S) isomer or the (R) isomer, such a homopolymer tends to be opaque.

Examples of the unit (A) of the lactone compound represented by the general formula (1) may include units of such as α-methylene-β-methyl-γ-methyl-γ-butyrolactone (βMγMMBL), α-methylene-β-methyl-γ-dimethyl-γ-butyrolactone (βMγDMMBL), α-methylene-β-methyl-γ-ethyl-γ-butyrolactone (βMγEMBL), α-methylene-β-methyl-γ-propyl-γ-butyrolactone (βMγPMBL), α-methylene-β-methyl-γ-cyclohexyl-γ-butyrolactone (βMγCHMBL), α-methylene-β-ethyl-γ-methyl-γ-butyrolactone (βEγMMBL), α-methylene-β-ethyl-γ,γ-dimethyl-γ-butyrolactone (βEγDMMBL), α-methylene-β-ethyl-γ-ethyl-γ-butyrolactone (βEγEMBL), α-methylene-β-ethyl-γ-propyl-γ-butyrolactone (βEγPMBL), or α-methylene-β-ethyl-γ-cyclohexyl-γ-butyrolactone (βEγCHMBL).

In particular, a compound in which each of $R^2$ and $R^3$ represents a hydrogen atom, such as α-methylene-β-methyl-γ-butyrolactone (βMMBL), α-methylene-α-ethyl-γ-butyrolactone (βEMBL), or α-methylene-β-propyl-γ-butyrolactone (βPMBL), is preferable because very high optical transparency can be obtained as core material for POFs. Among these, βMMBL and βEMBL are particularly preferable because a small amount of βMMBL or βEMBL exhibits an excellent effect on increasing the glass transition temperature.

The unit (A) of the lactone compound represented by the general formula (1) may be one unit or a combination of two or more units.

Examples of the unit (B) of (meth)acrylate constituting the polymer composition according to the present invention may include units of alkyl (meth)acrylates, cycloalkyl (meth)acrylates, aromatic (meth)acrylates, substituted aromatic (meth)acrylates, halogenoalkyl (meth)acrylates, hydroxyalkyl (meth)acrylates, and other (meth)acrylates.

Examples of the alkyl (meth)acrylates may include: methyl (meth)acrylate, ethyl (meth)acrylate, butyl (meth)acrylate, 2-ethylhexyl (meth)acrylate, and the like. Examples of the cycloalkyl (meth)acrylates may include: cyclohexyl (meth)acrylate, methylcyclohexyl (meth)acrylate, bornyl (meth)acrylate, isobornyl (meth)acrylate, adamantyl (meth)acrylate, and the like.

Examples of the aromatic (meth)acrylates may include: phenyl (meth)acrylate, benzyl (meth)acrylate, tricyclo[5.2.1.02,6]-deca-8-yl (meth)acrylate, and the like.

Examples of the substituted aromatic (meth)acrylates may include: fluorophenyl (meth)acrylate, chlorophenyl (meth)acrylate, fluorobenzyl (meth)acrylate, chlorobenzyl (meth)acrylate, and the like.

Examples of the halogenoalkyl (meth)acrylates may include: fluoromethyl (meth)acrylate, fluoroethyl (meth)acrylate, trifluoroethyl (meth)acrylate, 2,2,3,3,-tetrafluoropropyl (meth)acrylate, 2,2,3,3,3-pentafluoropropyl methacrylate, 2,2,3,3,4,4,5,5-octafluoropentyl (meth)acrylate, 1,1,2,2-tetrahydroperfluorooctyl (meth)acrylate, 1,1,2,2-tetrahydroperfluorodecanyl (meth)acrylate, hexafluoroneopentyl (meth)acrylate, 1,1,2,2-tetrahydroperfluorododecanyl (meth)acrylate, 1,1,2,2-tetrahydroperfluorotetradodecanyl (meth)acrylate, and the like.

Examples of the hydroxyalkyl (meth)acrylates may include: 2-hydroxyethyl (meth)acrylate, 2-hydroxypropyl (meth)acrylate, and the like.

Examples of other (meth)acrylates may include: glycidyl (meth)acrylate, methylglycidyl methacrylate, ethylene glycol (meth)acrylate, polyethylene glycol (meth)acrylate, and the like.

The unit (B) of (meth)acrylate may be one unit or a combination of two or more of units of the above (meth)acrylates.

Among the (meth)acrylates, methyl methacrylate (MMA) is particularly preferable because MMA is well copolymerizable with lactone compounds and MMA is excellent in maintenance of transparency, mechanical strength, and heat resistance when used as core material of POFs.

As for contents of the unit (A) of the lactone compound and the unit (B) of (meth)acrylate in a polymer comprising the units, the unit (A) of the lactone compound is 5 to 100% by mass, and the unit (B) of (meth)acrylate is 0 to 95% by mass. Preferably, the polymer comprises 5 to 50% by mass of the unit (A) of the lactone compound, and 50 to 95% by mass of the unit (B) of MMA. More preferably, the polymer comprises 20 to 40% by mass of the unit (A) of the lactone compound, and 60 to 80% by mass of the unit (B) of MMA. A polymer comprising the unit (A) of the lactone compound and the unit (B) of (meth)acrylate in such ratios has a high Tg equal to or more than 115° C., and thus the polymer having sufficient heat resistance can be obtained. When a polymer comprises the unit (A) of the lactone compound equal to or more than 5% by mass, the polymer has an increased Tg. In particular, when such a polymer is used as a core material for POF, the POF can have enhanced heat resistance. The upper limit of the content of the unit (A) of the lactone compound is not particularly restricted. When a polymer comprising the unit (A) of the lactone compound equal to or less than 50% by mass is used as a core material for POF, mechanical strength of the POF can be prevented from deteriorating and the POF can be obtained at low cost.

Furthermore, the polymer composition according to the present invention may comprise as constitutional units not only the unit (A) of the lactone compound and unit (B) of (meth)acrylate but also another unit (C) of copolymerizable monomer depending on required properties such as low hygroscopicity, heat resistant temperature, bendability, or mechanical strength. The polymer composition preferably comprises another unit (C) of copolymerizable monomer in the range equal to or less than 40% by mass of all the constitutional units.

Examples of the unit (C) of the monomer may include, without limitation, units of unsaturated fatty acid esters, aromatic vinyl compounds, vinyl cyanide compounds, hydrophilic vinyl compounds, unsaturated dibasic acids and derivatives thereof, and unsaturated fatty acids and derivatives thereof.

Examples of the aromatic vinyl compounds may include: styrene, α-substituted styrene such as α-methyl styrene or α-ethyl styrene; substituted styrene such as fluorostyrene, or methyl styrene; and the like.

Examples of the vinyl cyanide compounds may include acrylonitrile, methacrylonitrile, and the like. An example of the hydrophilic vinyl compounds is (meth)acrylic acid.

Examples of the unsaturated dibasic acids and derivatives thereof may include: N-substituted maleimide such as N-methylmaleimide, N-ethylmaleimide, N-propylmaleimide, N-cyclohexylmaleimide, N-phenylmaleimide, N-methylmaleimide, or N-chlorophenylmaleimide; maleic acid, maleic anhydride, fumaric acid, and the like.

Examples of the unsaturated fatty acids and derivatives thereof may include: (meth)acrylamides such as (meth)acrylamide, N-dimethyl(meth)acrylamide, and N-diethyl(meth)acrylamide; metallic salts of (meth)acrylic acid such as calcium (meth)acrylate, barium (meth)acrylate, lead (meth)acrylate, tin (meth)acrylate, and zinc (meth)acrylate; (meth)acrylic acid; and the like.

The molecular weight of a polymer comprising the unit (A) of the lactone compound and the unit (B) of (meth)acrylate is preferably in a range that does not deteriorate fabrication processability and that provides sufficient mechanical strength. For example, such a molecular weight (weight average molecular weight) relative to polystyrene measured by GPC is preferably 10,000 to 300,000, more preferably 50,000 to 150,000, and still more preferably 70,000 to 125,000. The molecular weight equal to or more than 10,000 can prevent POFs from becoming brittle. The molecular weight equal to or less than 300,000 can provide a sufficient effect of reducing light scattering loss due to thermal melting.

The polymer composition according to the present invention can be manufactured by a method of polymerizing a mixture of monomers comprising 5 to 100% by mass of a lactone compound represented by the general formula (1) comprising the (S) isomer represented by the general formula (2) and the (R) isomer represented by the general formula (3) at a mass ratio of from 70/30 to 30/70, and 0 to 95% by mass of a (meth)acrylate unit (B) so that the mixture has a polymer content equal to or greater than 94%; and then subjecting the mixture to thermal melting under conditions of a temperature of Tc° C. (Tc≧Tg+40) (Tg denotes a glass transition temperature of the polymer composition) and of a pressure equal to or greater than 0.6 MPa.

As a method of polymerizing the lactone compound represented by the general formula (1) and the (meth)acrylate, any method may be used. A preferred method is radical polymerization. In addition, polymerization type of radical polymerization may be solution polymerization, bulk polymerization, suspension polymerization, emulsion polymerization, or the like. In view of reducing light scattering loss of POFs, bulk polymerization method or solution polymerization method is optimum. The bulk polymerization method is preferable because mixing of impurities can be prevented. The solution polymerization method is preferable because molecular weight, molecular weight distribution, composition distribution and the like are easily controlled.

A method of obtaining a polymer from the monomers by bulk polymerization will be described. First, a polymerization initiator and optionally a chain transfer agent are mixed with a mixture of monomers comprising a lactone compound represented by the general formula (1) comprising the (S) isomer and the (R) isomer at a mass ratio of from 30/70 to 70/30, optionally (meth)acrylate, and in some cases other copolymerizable monomers.

Next, the resulting mixture is kept at a given temperature for a certain period of time to complete polymerization. The resulting bulk polymer is pulverized and further extruded while being devolatilized, thereby removing unreacted monomers, polymerization initiators, chain transfer agents and the like remaining in the polymer to obtain the polymer product.

The polymerization initiator is not particularly restricted as long as the polymerization initiator does not cause detrimental effects of side reactions, coloring, or the like on polymerization. The polymerization initiator may be selected arbitrarily depending on polymerization type, polymerization temperature, rate of polymerization, and polymerization time. The polymerization initiator may be used in combination of two or more initiators. Examples of the polymerization initiator may include: azo initiators such as 2,2'-azobis(2,4,4-trimethylpentane) (manufactured by Wako Pure Chemical Industries, Ltd.; trade name: VR-110), 2,2'-azobis(isobutyronitrile), 1,1-azobis(cyclohexanecarbonitrile), 2,2'-azobis(2,4-dimethylvaleronitrile), or 2,2'-azobis(dimethyl isobutyrate) (manufactured by Wako Pure Chemical Industries, Ltd.; trade name: V-601); and peroxide initiators such as benzoyl peroxide, lauryl peroxide, dicumyl peroxide, di-t-butyl peroxide, t-butyl peroxy 2-ethylhexanoate, or 1,1-di-t-butylperoxy-2-methylcyclohexane. Among these initiators, the azo initiators are preferable because they have less influence of coloring polymers by heat, and V-601 is particularly preferable. The amount of the polymerization initiator to be used may be 0.001 to 3 parts by mass to 100 parts by mass of the monomer components.

The chain transfer agent used for the purpose of adjusting molecular weight in polymerization can be selected arbitrarily in order to obtain a target molecular weight as long as the chain transfer agent does not cause any detrimental effect of progressing side reactions, coloring products, or the like in polymerization. The chain transfer agent may be used in combination of two or more agents. Examples of the chain transfer agent may include: primary, secondary or tertiary mercaptan such as n-butyl mercaptan, isobutyl mercaptan, tert-butyl mercaptan, or n-octyl mercaptan; and thioglycolic acid, and its esters. In particular, n-butyl mercaptan is preferable because its vaporization temperature is low and it is easily removed by vaporization in a melt extrusion step. The amount of the chain transfer agent to be used may be in a range equal to or less than 3 parts by mass to 100 parts by mass of the monomer components.

Polymerization temperature varies depending on a polymerization initiator and polymerization type to be used. Polymerization temperature is in the range of 50 to 170° C., more preferably in the range of 60 to 150° C.

A polymer composition having high heat resistance, exhibiting less deterioration of transmission characteristics under high temperature environment, and suitable as core material can be obtained by conducting polymerization by continuous bulk polymerization or continuous solution polymerization using the azoalkane thermal polymerization initiator as a polymerization initiator and using the low boiling point mercaptan as a chain transfer agent; and feeding the resulting polymer to a devolatilization extruder to remove unreacted monomers, mercaptan, solvents and the like.

The mixture of monomers is polymerized until its polymer content reaches 94%. The polymer content is preferably equal to or greater than 97%, more preferably equal to or greater than 99%. The polymer content equal to or greater than 94% prevents unpolymerized remaining monomers from foaming in thermal melting to be described later. The polymer content equal to or greater than 94% can be achieved by a method of adjusting conditions such as polymerization temperature or concentration of a polymerization initiator; or by feeding an obtained polymer to a devolatilization extruder to remove unreacted monomers, mercaptan, solvents and the like. The resulting polymer composition is less decomposed at high temperatures equal to or more than 200° C. Balance of low hygroscopicity and heat resistance of the polymer composition can be adjusted properly by selecting composition of monomers to be copolymerized.

However, the polymer composition obtained by polymerizing a mixture of monomers to achieve polymer content equal to or greater than 94% has localized variation of compositions due to uneven structures formed in the polymerization. This localized variation of compositions causes variation of indexes of refraction, and which causes increase of light scattering loss of the polymer. In order to disperse and remove the uneven structures, the polymer composition is subjected to thermal melting. This thermal melting is to process the polymer composition containing a polymer under conditions of a temperature of Tc° C. (Tc≧Tg+40) (Tg denotes a glass transition temperature of the polymer composition) and of a pressure equal to or greater than 0.6 MPa. The polymer composition is subjected to thermal melting at a temperature equal to or greater than (Tg+40)° C., whereby the uneven structures can be totally eliminated, and light scattering loss can be considerably reduced. On the other hand, the polymer composition is subjected to thermal melting at a pressure equal to or greater than 0.6 MPa, whereby foaming of the polymer composition can be prevented when the system reaches temperatures equal to or greater than the boiling point of any one monomer.

The time of conducting thermal melting can be changed properly depending on temperature Tc of thermal melting and conditions of polymers. The time can be selected properly in the range not including long hours that cause coloring of the polymer composition due to heat deterioration to remove the uneven structures sufficiently. For example, the time can be selected properly from the range of 30 minutes to 5 hours so that the value of light scattering loss falls within a target range.

Typically, a lactone compound in general and the (meth)acrylate unit (B) satisfy a relation of $r_1 \geq 1 > r_2 > 0$ where the reactivity ratios of the lactone compound and the (meth)acrylate in copolymerization are defined as $r_1$ and $r_2$ respectively. When this relation is satisfied, a copolymer comprising the lactone compound and the (meth)acrylate tends to become a block copolymer and therefore its light scattering loss is large. However, when the unit (A) of the lactone compound having a structure of a substituent at the β position is used as the lactone compound, remarkable reduction of light scattering loss is achieved by thermal melting, whereby such a copolymer can be applied to core materials of POFs.

For example, reactivity ratios of α-methylene-β-methyl-γ-butyrolactone (βMMBL) and MMA measured by Finemann-Loss method (Journal of Polymer Science, VOl. 5, p 259 (1950)) are $r_1$=1.9 and $r_2$=0.50 respectively. Reactivity ratios of α-methylene-γ,γ-dimethyl-γ-butyrolactone (DMBL) and MMA are $r_1$=3.6 and $r_2$=0.38.

However, when these copolymers are subjected to thermal melting according to the present invention, vast deterioration of transparency probably caused by phase separation in a block copolymer is observed in the copolymer comprising DMBL and MMA, whereas reduction of light scattering loss is achieved in the copolymer comprising βMMBL and MMA and this copolymer has the level of light scattering loss sufficiently usable for core materials of POFs.

The polymer can contain as necessary, before or after thermal melting, other substances such as coloring agents such as dyes or pigments, various antioxidants, release agents or the like known in the art.

The resulting polymer composition according to the present invention can achieve a total light scattering loss of not more than 100 dB/km. POFs using the polymer composition according to the present invention as core material can achieve excellent transmission loss equal to or less than 400 dB/km. Furthermore, the polymer composition of adjusting properly balance of low hygroscopicity and heat resistance can provide 90.5% or more of light transmittance measured according to the ASTM D1003 standard. And thus the polymer composition according to the present invention can be applied not only to information transmission such as communication wirings in automobiles, but also various optical parts that requires heat resistance as well as high level of transparency and extremely low light scattering loss such as gradient index lenses, optical waveguides, or optical devices in the optoelectronics field.

Next, a plastic optical fiber according to the present invention will be described.

The plastic optical fiber according to the present invention is characterized in that the fiber has a transmission loss not more than 400 dB/km and a core of a polymer composition comprising 5 to 100% by mass of a unit (A) of a lactone compound represented by the general formula (1) and 0 to 95% by mass of a unit (B) of (meth)acrylate as constitutional units, wherein the unit (A) of the lactone compound comprises the unit of (S) isomer represented by the general formula (2) and the unit of (R) isomer represented by the general formula (3) at a mass ratio of from 70/30 to 30/70.

Furthermore, the plastic optical fiber preferably has an index of refraction so that NA (Numerical Aperture) described later falls within a given range by an index of refraction of a clad.

In POFs according to the present invention, a clad provided on the outer periphery of the core is not restricted to a single layer, and the clad may comprise two or more layers. In view of reducing production cost, the clad preferably has a bilayer structure in which a first inner clad has a second clad provided concentrically on its outer periphery.

When the clad has the bilayer structure, an index of refraction n1 of a core, an index of refraction n2 of the first clad, and an index of refraction n3 of the second clad may satisfy a relation (4), $$n1 > n2 > n3 \quad (4)$$

or may satisfy a relation (5) and (6), $$n1 > n2 \quad (5)$$

$$n2 < n3 \quad (6).$$

The indexes of refraction denote those obtained with sodium D line at 25° C.

In particular, POFs satisfying the relation (4) are preferable because even when the POFs are bent and light leaks from the first clad, the leaked light is reflected by the second clad, thereby reducing transmission loss.

POFs according to the present invention preferably have numerical apertures in the range of 0.3 to 0.7. In particular, POFs for LA in automobile preferably have numerical apertures in the range of 0.5 to 0.65. POFs that have been actually used so far have NAs in the range. When the POFs according to the present invention having NAs mentioned above are coupled to the POFs in actual use or light receiving element/light emitting element, increase of coupling loss due to difference of NAs can be suppressed. The NA is a parameter defined by a formula (7) as with numerical aperture (NA) generally used in the general optical field, $$NA=(n\text{core}^2-n\text{clad}^2)^{0.5} \tag{7}$$

wherein ncore denotes an index of refraction of a core member, and nclad denotes an index of refraction of a clad member.

Clad members used for POFs according to the present invention may be properly selected from fluorine-containing olefin resins, fluorinated methacrylate polymers, and the like. When the clad has a monolayer structure, either fluorine-containing olefin resins or fluorinated methacrylate polymers or both of fluorine-containing olefin resins and fluorinated methacrylate polymers may be used. When the clad comprises multi layers of two or more, fluorinated methacrylate polymers are preferably selected as the innermost clad.

The fluorine-containing olefin resins used for the clad preferably include a tetrafluoroethylene (TFE) unit. Examples of such fluorine-containing olefin resins may include: a terpolymer consisting of 10 to 60% by mass of a vinylidene fluoride (VdF) unit, 20 to 70% by mass of the TFE unit and 5 to 35% by mass of a hexafluoropropylene (HFP) unit; a terpolymer consisting of 5 to 25% by mass of the VdF unit, 50 to 80% by mass of the TFE unit and 5 to 25% by mass of a perfluoro (fluoro)alkyl vinyl ether unit; a quaterpolymer consisting of 10 to 30% by mass of the VdF unit, 40 to 80% by mass of the TFE unit, 5 to 40% by mass of the HFP unit and 0.1 to 15% by mass of the perfluoro(fluoro)alkyl vinyl ether unit; a bipolymer consisting of 40 to 90% by mass of the TFE unit and 10 to 60% by mass of the perfluoro(fluoro)alkyl vinyl ether unit; a bipolymer consisting of 30 to 75% by mass of the TFE unit and 25 to 70% by mass of the HFP unit; and the like.

Furthermore, the fluorine-containing olefin resins including the TFE unit preferably do not have high crystallinity. This is because fluorine-containing olefin resins including the TFE unit and having high crystallinity tend to have reduced transparency. The crystallinity of fluorine-containing olefin resins can be shown by heat of crystal fusion measured by differential scanning calorimetry (DSC) as an indicator. The heat of crystal fusion is heat generated by thermally fusing crystalline components derived from the TFE unit and the VdF unit of fluorine-containing olefin resins. Fluorine-containing olefin resins having larger heat of crystal fusion tend to have higher crystallinity. Fluorine-containing olefin resins including the TFE unit preferably have heat of crystal fusion equal to or less than 40 mJ/mg. Fluorine-containing olefin resins with heat of crystal fusion equal to or less than 40 mJ/mg can prevent increase of transmission loss of POFs even when the POFs are exposed under high temperature environment at about 125° C. for a long time. Low heat of crystal fusion can result in low crystallinity of a resin, thereby preventing increase of transmission loss of POFs even under high temperature environment for a long time. Therefore, more preferably, the fluorine-containing olefin resins have heat of crystal fusion equal to or less than 20 mJ/mg. Still more preferably, the heat of crystal fusion is equal to or less than 15 mJ/mg in order to realize extremely high heat resistance.

On the other hand, the fluorinated methacrylate polymers are easily adjusted in their indexes of refraction, and have good transparency and heat resistance while the polymers are excellent in flexibility and processability. Therefore, the fluorinated methacrylate polymers are suitable as cladding materials for POFs.

When the clad is a multi layer clad, an example of the fluorinated methacrylate polymers particularly suitable for the innermost layer is a copolymer comprising 15 to 90% by mass of a unit (D) of fluoroalkyl (meth)acrylate represented by a general formula (8), $$CH_2=CX-COO(CH_2)m-R1f \tag{8}$$

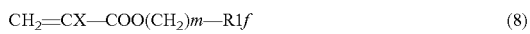

wherein X represents a hydrogen atom, a fluorine atom, or a methyl group; R1f represents a $C_{1-12}$ (fluoro)alkyl group; and m represents an integer of 1 or 2; and 10 to 85% by mass of another unit (E) of copolymerizable monomer. The copolymer has an index of refraction in the range of 1.39 to 1.475.

More specifically, examples of the unit (D) of fluoroalkyl (meth)acrylate represented by the general formula (8) may include units of fluoroalkyl (meth)acrylate represented by a general formula (9), $$CH_2=CX-COO(CH_2)m(CF_2)nY \tag{9}$$

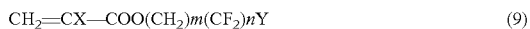

wherein X represents a hydrogen atom, a fluorine atom, or a methyl group; Y represents a hydrogen atom or a fluorine atom; m represents 1 or 2; and n represents an integer of 1 to 12; or a general formula (10), $$CH_2=CX-COO(CH_2)m-(C)R2fR3R1 \tag{10}$$

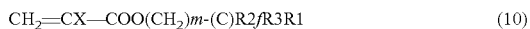

wherein X represents a hydrogen atom, a fluorine atom, or a methyl group; R2f and R3f independently represent a fluoroalkyl group; R1 represents a hydrogen atom, a methyl group or a fluorine atom; m represents 1 or 2; and n represents an integer of 1 to 12.

Specific examples of the fluoroalkyl (meth)acrylates represented by the general formula (9) may include fluorinated (meth)acrylates comprising linear fluoroalkyl groups as side chains such as 2,2,2-trifluoroethyl (meth)acrylate (3FM), 2,2,3,3-tetrafluoropropyl (meth)acrylate (4FM), 2,2,3,3,3-pentafluoropropyl (meth)acrylate (5FM), 2,2,3,4,4,4-hexafluorobutyl (meth)acrylate (6FM), 1H,1H,5H-octafluoropentyl (meth)acrylate (8FM), 2-(perfluorobutyl)ethyl (meth)acrylate (9FM), 2-(perfluorohexyl)ethyl (meth)acrylate (13FM), 1H,1H,9H-hexadecafluorononyl (meth)acrylate (16FM), 2-(perfluorooctyl)ethyl (meth)acrylate (17FM), 1H, 1H,11H-(icosafluoroundecyl) (meth)acrylate (20FM), and 2-(perfluorodecyl)ethyl (meth)acrylate (21 FM).

Specific examples of the fluoroalkyl (meth)acrylates represented by the general formula (10) may include fluorinated (meth)acrylates comprising branched fluoroalkyl groups as side chains such as hexafluoroneopentyl (meth)acrylate or hexafluoroisobutyl (meth)acrylate.

Meanwhile, the fluorinated methacrylate polymers for forming the clad can comprise the unit (D) of fluoroalkyl (meth)acrylate represented by the general formula (8) and another unit (E) of copolymerizable monomer. The unit (E) of monomer may be the unit of lactone compound represented by the general formula (1) comprising the unit of (S) isomer represented by the general formula (2) and the unit of (R) isomer represented by the general formula (3) at a mass ratio of from 70/30 to 30/70. Specifically, examples of such the unit of lactone compound may include units of α-methylene-α-alkyl-γ-butyrolactones such as α-methylene-β-methyl-γ-butyrolactone, α-methylene-β-methyl-γ-methyl-γ-butyrolactone, or α-methylene-β-ethyl-γ-butyrolactone.

The fluorinated methacrylate polymers comprising the unit (D) of fluoroalkyl (meth)acrylate represented by the general formula (8); and the unit of lactone compound represented by the general formula (1) as the another unit (E) of copolymerizable monomer comprising the unit of (S) isomer represented by the general formula (2) and the unit of (R) isomer represented by the general formula (3) at a mass ratio of from 70/30 to 30/70 are particularly preferable. This is because the fluorinated methacrylate polymers are excellent in transparency as cladding materials and also good in mechanical strength and heat resistance (glass transition temperature and resistance to thermal decomposition).

The another unit (E) of copolymerizable monomer may comprise an alkyl (meth)acrylate unit such as methyl (meth)acrylate, ethyl (meth)acrylate, or butyl methyl (meth)acrylate in addition to the lactone compound unit in order to improve heat resistance (glass transition temperature and resistance to thermal decomposition), water absorption and mechanical strength of cladding materials.

The fluorine-containing olefin resins and the fluorinated methacrylate polymers that form clads preferably have melt mass-flow rates (MFR) in the range of 5 to 50, more preferably in the range of 10 to 40, and still more preferably in the range of 15 to 25. MFR equal to or less than 50 prevents deterioration of flexibility or processability of POFs, and deterioration of transmission loss of POFs due to deformation of cladding materials when POFs are under high temperature environment. MFR equal to or more than 5 prevents deterioration of formability of copolymers.

The configuration of a core and a clad of the POF according to the present invention may be an SI type comprising a core/clad structure in which a central shaft-like core is surrounded by a clad with lower index of refraction than the core; or a multi core with a sea-island structure in which island portions comprising plural cores or core/clad structures are interspersed in a sea portion comprising a clad. The configuration is not restricted to the above examples, and may be various configurations with core/clad structures.

The POF according to the present invention may comprise a protective layer on the outer periphery of the POF. Examples of materials for the protective layer may include, without limitation, the materials for cladding materials mentioned above such as a copolymer of VdF and TFE; a copolymer of VdF, TFE and HFP; a copolymer of VdF, TFE, HFP, and a perfluoro(fluoro)alkyl vinyl ether; a copolymer of VdF, TFE, and a perfluoro(fluoro)alkyl vinyl ether; a copolymer of ethylene, TFE, and HFP; a copolymer of TFE and HFP; or a copolymer of VdF, TFE, and hexafluoroacetone. The protective layer may be formed on a core/clad structure by a coating method or a dipping method. The protective layer may also be formed in conjunction with a core and a clad by extrusion with a conjugate fiber spinning nozzle.

When the POF is subjected to a heat treatment at 125° C. for 24 hours, a longitudinal thermal shrinkage rate of the POF is preferably equal to or less than 1.5%. When the thermal shrinkage rate is equal to or less than 1.5%, in the case of using the POF as a POF cable comprising a coating layer formed with a thermoplastic resin under high temperatures of 125° C. or more for a long time as described later, the coating layer prevents shrinkage of the POF and generation of pistoning. In order to further improve dimensional stability of the POF and further reduce pistoning of the POF under high temperature environment, the longitudinal thermal shrinkage rate of the POF is preferably equal to or less than 1%, and more preferably equal to or less than 0.5%.

The thermal shrinkage rate can be achieved by setting Tg of a polymer forming a core material or degree of stretching for imparting proper flexibility to the POF depending on environmental temperature at which the POF is used, and further by subjecting the POF to relaxation so that properties of the POF such as mechanical strength or transmission loss are not impaired.

For example, when the POF is used at an environmental temperature of 125° C., it is preferable that the Tg of a core material is in the range of 140 to 160° C., and the degree of stretching of the POF is in the range of 1.3 to 3.0. The degree of stretching is a value calculated, in the case of letting the POF sit in a thermostatic chamber at 150° C. for 20 minutes, from degree of stretching=(d2/d1) wherein a thread diameter before the heat treatment is defined as d1 and a thread diameter after the heat treatment is defined as d2.

Examples of a method for manufacturing the POF may include a method wherein a core is formed of the core material, then a solution of the cladding material is obtained by dissolving the cladding material in a solvent such as ethyl acetate, dimethylformamide, or dimethylacetamide, and the solution is coated on the surface of the core by a coating method or a dipping method to form a clad. Examples of a method for manufacturing an SI type POF may include a method of extrusion by a conjugate spinning method with a conjugate fiber spinning nozzle to form a POF in which its core is coated with its clad. In particular a POF in which light scattering loss of its core is sufficiently reduced, transmission loss is sufficiently low and heat resistance is high can be obtained by extrusion by setting the fiber spinning equipment under conditions of the inside temperature of Tc° C. (Tc≧Tg+40) (Tg denotes a glass transition temperature of the polymer composition) and the pressure equal to or greater than 0.6 MPa.

A plastic optical fiber cable according to the present invention is characterized by comprising a coating layer comprising a thermoplastic resin on the outer periphery of the plastic optical fiber.

The coating layer is provided on the outer periphery of the clad of the plastic optical fiber or on the outer periphery of a protective layer, thereby improving flexibility and resistance to moist heat.

The thermoplastic resin used as a material of the coating layer may be, for example depending on environment in which a POF cable is used, one or a mixture of two or more selected from the group consisting of polyamide resins, polyethylene resins, polypropylene resins, water-crosslinked polyethylene resins, water-crosslinked polypropylene resins, polyvinylidene chloride resins, chlorinated polyethylene resins, polyurethane resins, vinylidene fluoride resins, and various UV or ultraviolet curing resins. The coating layer does not contact directly with the core, therefore deterioration of transparency due to crystallization does not particularly cause problems.

Among the resins, polyamide resins and water-crosslinked polyethylene resins are suitable as materials of coating layers of POFs to be used for automobiles or the like that require heat resistance and environmental resistance because the resins are excellent in heat resistance, flexibility, and solvent resistance. In addition, the resins have good processability and proper melting point, whereby POFs can be coated with the resins easily without deteriorating transmission properties of the POFs.

In particular, examples of the polyamide resins may include homopolymers of monomers such as nylon 10, nylon 11, nylon 12, nylon 6, or nylon 66; copolymers formed in combination of the monomers; nylon elastomers comprising nylon monomers to which flexible segments are introduced; and the like. If necessary, polymers other than the polyamide resins or compounds may be further combined and used as the coating material.

A method for forming the coating layer may be selected properly depending on physical properties of the material to be coated. A preferred method is to form the coating layer with a crosshead die in view of excellent processability.

EXEMPLARY EMBODIMENTS

Hereinafter, polymer compositions, POFs, POF cables according to the present invention are explained in detail referring to exemplary embodiments. However, the technical scope of the invention is not restricted to the exemplary embodiments. Abbreviations of monomers used in exemplary embodiments and comparative examples denote the following compounds respectively.

(R)-βMMBL: (R) α-methylene-β-methyl-γ-butyrolactone
(S)-βMMBL: (S) α-methylene-β-methyl-γ-butyrolactone
MMA: methyl methacrylate
MAA: methacrylic acid
α3FA: 2,2,2-trifluoroethyl α-fluoroacrylate
αFMe: methyl α-fluoroacrylate
6FNPMA: hexafluoroneopentyl methacrylate
VdF: vinylidene fluoride
TFE: tetrafluoroethylene
HFP: hexafluoropropylene
TFMVE: perfluoro trifluoromethyl vinyl ether ($CF_2$=$CFOCF_3$)
PFPVE: perfluoro pentafluoropropyl vinyl ether ($CF_2$=$CFOCH_2CF_2CF_3$)
PA12: nylon 12 (manufactured by Daicel-Degussa, Ltd.; trade name: Diamide L1640)

Methods of evaluating physical properties of polymer compositions and POFs in exemplary embodiments and comparative examples are as follows.

[Glass Transition Temperature (Tg)]

Differential scanning calorimetry (DSC) (manufactured by Seiko Instruments Inc., DSC-220) was used for the measurement. Polymer pellets were melted by increasing the temperature up to 220° C. at a temperature rise rate of 10° C./minute and keeping the temperature for 5 minutes. Then, the temperature was decreased down to 0° C. at a temperature drop rate of 10° C./minute. Again the temperature was increased at a temperature rise rate of 10° C./minute, kept for 5 minutes, and decreased at a temperature drop rate of 10° C./minute. Glass transition temperature was measured at this time.

[Resistance to Thermal Decomposition]

A solution in which an obtained polymer was dissolved in THF (tetrahydrofuran) was added dropwise to methanol to precipitate a polymer. The polymer was collected by filtration. Then the polymer was dried with a vacuum dryer at 50° C. for 24 hours to obtain a measurement sample. The measurement was conducted with an SEIKO DTA/TGA220 (a differential thermo-gravimetry measurement equipment) manufactured by Seiko Instruments & Electronics Ltd. The obtained measurement sample was measured in terms of decrease of weight at each temperature while the temperature was increased according to the following conditions.

Measurement atmospheric condition: nitrogen (flow rate: 200 ml/minute)

1st step of increasing temperature: 40° C. to 10° C. (at a temperature rise rate of 10° C./minute), and kept 100° C. for 60 minutes 2nd step of increasing temperature: 100° C. to 500° C. (at a temperature rise rate of 10° C./minute)

Evaluation method: The weight of the measurement sample after being kept at 100° C. for 60 minutes was defined as the weight of the sample. Then decrease of weight at each temperature shown in Table 1 was evaluated according to the following standards.

Good: almost no decrease of weight was observed.
Fair: a little decrease of weight was observed.
Poor: considerable decrease of weight was observed.

[Index of Refraction]

Polymer pellets were used to form a film specimen with a thickness of 200 μm by melt-press. Then an index of refraction (nD25) of sodium D line at 25° C. was analyzed by an Abbe refractometer.

[Light Transmittance]

Polymer pellets were used to form an injection-molded specimen with a thickness of 2.0 mm. Then light transmittance of the specimen was measured according to ASTM D1003 standard.

[Measurement of Total Light Scattering Loss ($\alpha t$)]

Total light scattering loss ($\alpha t$) was analyzed by a fully automatic light scattering photometer (manufactured by Mitsubishi Rayon Co. Ltd.). An argon laser at 488 nm was used as a light source, and the light source was installed to provide a vertical polarized light. An incident light entered a cylindrical polymer rod from its side which was set at the center of a goniometer. Then a vertical polarized light was launched, and a scattering intensity (Vv) at which the vertical polarized light scatters and angle dependency of a scattering intensity (Hv) at which the vertical polarized light scatters were measured. An absolute scattering intensity of the sample was determined with reference to the scattering intensity of benzene. Based on the resulting Vv and Hv, isotropic scattering loss $\alpha^{iso}$ and anisotropic scattering loss $\alpha^{aniso}$ were calculated according to the method described in Macromolecules, Vol. 22, P1367 (1989) to obtain a total scattering loss at ($=\alpha^{iso}+\alpha^{aniso}$) (converted to a value at 650 nm).

[Transmission Loss]

A light with an excitation NA of 0.1 and a measurement wavelength of 650 nm was used. Transmission loss of a POF was measured by a 20 m-5 m cutback method.

[Thermal Shrinkage Rate]

A POF with a test length of 1 m was hung in a dryer at 125° C. After a lapse of 24 hours, variation of the test length was measured and divided by the initial test length (1 m) to obtain a longitudinal shrinkage rate of the POF fiber.

[Method of Synthesizing Polymer]

(R)-α-methylene-β-methyl-γ-butyrolactone ((R)-αMMBL) and (S)-α-methylene-α-methyl-γ-butyrolactone ((S)-βMMBL) were synthesized according to Synthesis 1 to 8 to be explained hereafter.

[Synthesis 1] Synthesis of Racemic Modification 4-tert-butyl-1-methyl methyl succinate(a)

A1-methyl itaconate solution in toluene was placed in an autoclave. An ion exchange resin (RCP-160, Mitsubishi Chemical Corporation) was added thereto. Then isobutylene was added dropwise under cooled conditions and this solution was reacted at room temperature for 5 hours. After that, the ion exchange resin was filtered off from the reaction mixture. Thus remained solution was washed twice with equivalent 10% aqueous solution of sodium carbonate. An organic layer was dried with anhydrous sodium sulfate, and then concentrated to obtain 4-tert-butyl-1-methyl itaconate.

All of the resulting 4-tert-butyl-1-methyl itaconate was dissolved in methanol, and 5% palladium/carbon (Wako Pure Chemical Industries, Ltd.) was added thereto. This solution was hydrogenated with a condition of 1 kg/cm$^2$ to react for 2 hours. After the reaction was complete, the catalyst was filtered off. The remained solution was concentrated under a reduced pressure to obtain racemic modification 4-tert-butyl-1-methyl methyl succinate (a).

[Synthesis 2] Synthesis of Optically Active Methyl Succinate Derivative

*Escherichia coli* FERM BP 3835 were planted on an LB medium containing Ampicillin (1% polypeptone, 0.5% yeast extract, 0.5% NaCl) and shaking cultured at 37° C. for 24 hours. After the culture was complete, the culture solution was centrifuged. All of the resulting fungus mass was washed with ion exchanged water, and then suspended in 50 ml of 50 mM phosphate buffer (pH 7.0). The racemic modification 4-tert-butyl-1-methyl methyl succinate (a) obtained in (Synthesis 1) was added to this fungus mass suspension, and reacted at 30° C. for 20 hours. During the reaction, pH of the reaction solution was adjusted to be 7.0 with a 1 N aqueous solution of NaOH.

After the reaction was complete, the fungus mass was removed by centrifugation and unreacted 4-tert-butyl-1-methyl methyl succinate was extracted with ethyl acetate. The organic layer was dehydrated by adding anhydrous sodium sulfate thereto, and the solvent was removed by evaporation to obtain optically active 4-tert-butyl-1-methyl methyl succinate (a1). In order to measure its optical purity, this compound was treated with trifluoroacetic acid and hydrolyzed by a 3-fold mole aqueous solution of sodium hydroxide to provide optically active methylsuccinic acid. The optically active methylsuccinic acid was analyzed by high performance liquid chromatography (column: Chiralcel OD manufactured by Daicel-Degussa, Ltd.; moving bed: hexane/isopropanol/TFA=90/10/0.1; flow rate: 0.5 ml/min) to reveal that it was the (S) isomer with 95.5% e.e.

Meanwhile, 2 N hydrochloric acid was added to the water layer that remained after the extraction, and pH of this solution was adjusted to be 2.0. Then a reaction product, optically active 4-tert-butyl methyl succinate, was extracted with ethyl acetate. An organic phase was dehydrated by adding anhydrous sodium sulfate thereto, and the solvent was removed by evaporation to obtain optically active 4-tert-butyl methyl succinate (a2). Optical purity of this compound was measured as with above to reveal that it was the (R) isomer with 99.5% e.e.

Hereafter, physical properties of the compounds obtained above are shown.

(S)-4-tert-butyl-1-methyl methyl succinate (a1)

$^1$H-NMR spectrum CDCl$_3$, TMS as an internal reference δH 1.19-1.24 (3H, d, —CH$_3$) δH 1.44 (9H, s, -tBu) δH 2.29-2.38 (1H, m, —CH$_2$—) δH 2.60-2.69 (1H, m, —CH$_2$—) δH 2.83-2.91 (1H, m, —CH—) δH 3.69 (3H, s, —COOCH$_3$)

$^{13}$C-NMR spectrum CDCl$_3$, TMS as an internal reference δC 16.90 (—CH$_3$) δC 28.05 (-tBu) δC 35.76 (—CH$_2$—) δC 39.06 (—CH—) δC 51.77 (—COOCH$_3$) δC 80.66 (-tBu) δC 171.00 (—COOtBu) δC 175.84 (—COOCH$_3$) Optical purity (S) 95.5% e.e. Specific rotation [α]D25=−2.11 (neat)

(R)-4-tert-butyl methyl succinate (a2)

$^1$H-NMR spectrum CDCl$_3$, TMS as an internal reference δH 1.23-1.25 (3H, d, —CH$_3$) δH 1.44 (9H, s, -tBu) δH 2.32-2.40 (1H, m, —CH$_2$—) δH 2.60-2.69 (1H, m, —CH$_2$—) δH 2.86-2.93 (1H, m, —CH—) δH 9.80 (1H, s, —COOH)

$^{13}$C-NMR spectrum CDCl$_3$, TMS as an internal reference δC 16.69 (—CH$_3$) δC 28.02 (-tBu) δC 35.91 (—CH$_2$—) δC 38.75 (—CH—) δC 81.01 (-tBu) δC 170.98 (—COOtBu) δC 181.53 (—COOH) Optical purity (R) isomer: 99.5% Specific rotation [α]D25=+4.74 (c=2.30, EtOH)

[Synthesis 3] Synthesis of (R)-t-butyl 4-hydroxy-3-methylbutanoate (b)

Sodium borohydride was suspended in tetrahydrofuran anhydrous. Boron trifluoride-diethyl ether complex was gradually added to this solution cooled in ice and stirred for an hour. After that, precipitated sodium borofluoride was filtered under nitrogen flow (Sodium borohydride was 1.1 equivalents to boron trifluoride).

A solution of the (R)-4-tert-butyl methyl succinate (a2) (optical purity 99.5% ee) obtained in (Synthesis 2) in tetrahydrofuran anhydrous was added dropwise to the above prepared solution of boron-tetrahydrofuran complex cooled in ice, and a reaction was conducted at the same temperature for 2 hours. After the reaction was complete, methanol was gradually added to the reaction solution cooled in ice. The resulting reaction solution was concentrated to obtain crude (R)-t-butyl 4-hydroxy-3-methylbutanoate (b). Analysis with liquid chromatography revealed that this compound comprised 97.0% of (R)-t-butyl 4-hydroxy-3-methylbutanoate (b), 0.1% of (R)-methylsuccinic acid, 2.1% of (R)-2-methyl-1,4-butanediol, and 0.8% of unidentified compounds (liquid chromatography conditions: column ODS-120A (manufactured by Tosoh Corporation) 4.6 mm i.d.×25 cm; moving bed: acetonitrile/water/phosphoric acid=40/60/0.1; flow rate: 1.0 ml/min; detection: UV 220 nm). The (R)-2-methyl-1,4-butanediol was induced to tosylate according to standard procedures and then analyzed by liquid chromatography (liquid chromatography conditions: column ODS-120A (manufactured by Tosoh Corporation) 4.6 mm i.d.×25 cm; moving bed: acetonitrile/water/phosphoric acid=70/30/0.1; flow rate: 1.0 ml/min; detection: UV 254 nm).

The crude product was dissolved in ethyl acetate, and washed twice with a 10% aqueous solution of sodium carbonate. After that, an organic layer was dried with anhydrous sodium sulfate, and then concentrated to obtain (R)-t-butyl 4-hydroxy-3-methylbutanoate (b) (optical purity 98% ee; after being induced to (R)-β-methyl-γ-butyrolactone, optical rotation was measured. The result was [α]D20=+24.46° (c=2, methanol) (yield: 87%)).

[Synthesis 4] Synthesis of (S)-t-butyl-4-hydroxy-3-methylbutanoate (e)

The (S)-4-tert-butyl-1-methyl methyl succinate (a1) obtained in (Synthesis 1) was hydrolyzed by a 3-fold mole aqueous solution of sodium hydroxide to provide (S)-t-butyl 3-carboxybutanoate (d) (optical purity: 97% ee). The same procedures were conducted as with Synthesis 1 to 3 except that boron-tetrahydrofuran complex prepared with sodium borohydride of 1.2 times equivalent in Synthesis 3 and (S)-t- butyl 3-carboxybutanoate (e) was used as the material. As a result, (S)-t-butyl-4-hydroxy-3-methylbutanoate (e) was obtained (optical purity 97% ee; after being induced to (S)-β-methyl-γ-butyrolactone, optical rotation was measured. The result was [α]D20=−23.28° (c=4, methanol)) (yield: 85%).

[Synthesis 5] Synthesis of (R)-β-methyl-γ-butyrolactone (f)

The (R)-t-butyl 4-hydroxy-3-methylbutanoate (b) obtained in Synthesis 3, ethanol, and p-toluenesulfonic acid were placed in a round bottom flask with a magnetic stirrer and refluxed for 5 hours. After the reaction was complete, potassium carbonate powder was added to the solution while being cooled and then this solution was stirred at room temperature for about 1 hour. After that, undissolved salts were removed and the solution was concentrated under a reduced pressure. The resulting crude product was distilled under a reduced pressure to obtain the target (R)-β-methyl-γ-butyrolactone (f) (boiling point: 68° C./7 torr, purity: 95%).

[Synthesis 6] Synthesis of (4R)-3-ethyloxalyl-4-methyl-γ-butyrolactone (g)

A 28% solution of sodium methoxide in methanol was placed in a three-necked flask with an impeller in synchronization with a three-one motor and substituted with nitrogen. This solution was cooled with ice water. Diethyl oxalate was added dropwise to the solution through a dropping funnel, and then (R)-β-methyl-γ-butyrolactone (f) obtained in Synthesis 5 was added dropwise to the solution over about 30 minutes. After the dropping was complete, the solution was stirred for an hour while being cooled with ice water and maintaining the temperature in the flask to be 0 to 5° C. After that, the solution was stirred for three hours at room temperature and the reaction solution solidified. The solution was left standing at room temperature overnight. Subsequently the reaction solution was cooled with ice water, and then 35% concentrated hydrochloric acid and water were added to make the reaction solution suspended. Methyl t-butyl ether was added thereto to conduct extraction. After an organic phase was separated, methyl t-butyl ether was again added to a water phase and extraction was conducted. The resulting organic phases were combined and washed with saturate brine. The organic phase was dried with magnesium sulfate and then concentrated under a reduced pressure. Then the organic phase was heated in an oil bath at about 100° C. and fractions until 70° C./7 torr were evaporated to obtain crude α-ethyloxalyl-β-methyl-γ-butyrolactone (g). This compound was used in the following (Synthesis 7) without subjecting to further processes.

[Synthesis 7] Synthesis of (R)-α-methylene-β-methyl-γ-butyrolactone ((R)-βMMBL) (h)

Potassium carbonate was dissolved in water, and 37% formalin was added thereto. To this solution was added dropwise the crude (4R)-α-ethyloxalyl-β-methyl-γ-butyrolactone (g) dissolved in tetrahydrofuran over about an hour while stirring the solution at room temperature. After the dropping was complete, the solution was stirred at room temperature for 2 hours and then precipitated salts were separated by suction filtration. After that, a tetrahydrofuran phase was separated. Methyl t-butyl ether was added to the remained water phase and extraction was conducted.

The tetrahydrofuran phase and the methyl t-butyl ether phase were combined, washed with saturate brine, dried with magnesium sulfate, concentrated under a reduced pressure, and then distilled under a reduced pressure. The resulting (R)-α-methylene-1-methyl-γ-butyrolactone ((R)-βMMBL) (h) had a boiling point of 70 to 75° C./5 torr and GLC purity of 99%.

[Synthesis 8] Synthesis of (S)-α-methylene-β-methyl-γ-butyrolactone ((S)-βMMBL) (i)

The same procedures were conducted as with (Synthesis 5) to (Synthesis 7) except that (S)-t-butyl-4-hydroxy-3-methylbutanoate (d) obtained in (Synthesis 4) was used instead of (R)-t-butyl 4-hydroxy-3-methylbutanoate (b) in (Synthesis 5) to obtain (S)-α-methylene-β-methyl-γ-butyrolactone ((S)-βMMBL) (i). The (S)-βMMBL (i) had a boiling point of 70 to 75° C./5 torr and GLC purity of 99%.

Exemplary Embodiment 1

50 parts by mass of the (R)-βMMBL obtained in (Synthesis 7) and 50 parts by mass of the (S)-βMMBL obtained in (Synthesis 8) were combined to obtain a mixture of (R)-βMMBL and (S)-βMMBL ((R/S)-βMMBL) (h).

100 parts by mass of the (R/S)-βMMBL, 0.3 parts by mass of dimethyl 2,2'-azobis-isobutyrate (V-601) as a polymerization initiator, and 0.3 g parts by mass of n-butyl mercaptan as a chain transfer agent were placed in a beaker and stirred. This stirred and dissolved mixture was charged into a glass ampoule and dissolved oxygen was removed by repeating freezing and devolatilization five times. After that, the mixture was subjected to heat treatment at 65° C. for 12 hours in an oil bath and subsequently at 120° C. for 5 hours to complete polymerization.

The resulting bulk polymer was dissolved in methylene chloride, precipitated in methanol, filtered, washed with water and dried at 75° C. for 24 hours to obtain a polymer. After that, a twin-screw extruder (manufactured by IKEGAI Ltd., PCM30) was used to extrude and pelletize the polymer at a cylinder temperature of 230° C.

Furthermore, an injection molding machine (manufactured by NISSEI PLASTIC INDUSTRIAL CO., LTD., PS-60E) was used to conduct injection molding while changing injection pressure under conditions of a cylinder temperature of 230° C., a mold temperature of 75° C., an injection speed of 50%, an injection time of 10 seconds, and a cooling time of 25 seconds to prepare test specimens.

The obtained pellets and test specimens were evaluated in terms of index of refraction, glass transition temperature, light transmittance, and resistance to thermal decomposition. The results are shown in Table 1.

Exemplary Embodiments 2 to 7

Comparative Examples 1 to 7

Polymerization, pelletization, preparation of test specimens, and evaluation of various items were conducted as with Exemplary Embodiment 1 except that composition of the mixture of (R)-βMMBL, (S)-βMMBL, and MMA were changed as shown in Table 1. Obtained evaluation results are summarized in Table 1.

Exemplary Embodiments 8 to 11

Comparative Examples 8 to 11

Polymerization, pelletization, preparation of test specimens, and evaluation of light transmittance were conducted as with Exemplary Embodiment 1 except that composition of the mixture of (R)-βMMBL, (S)-βMMBL, and MMA were changed as shown in Table 2. Obtained evaluation results are summarized in Table 2.

Exemplary Embodiment 12

50 parts by mass of the (R)-βMMBL obtained in (Synthesis 7) and 50 parts by mass of the (S)-βMMBL obtained in (Synthesis 8) were combined to obtain a mixture of (R)-βMMBL and (S)-βMMBL ((R/S)-βMMBL) (h).

Furthermore, 10 parts by mass of the (R/S)-βMMBL was mixed with 90 parts by mass of MMA. To 100 parts by mass of this monomer mixture were added 0.3 parts by mass of dimethyl 2,2'-azobis-isobutyrate (V-601) as an initiator, and 0.2 parts by mass of n-butyl mercaptan as a chain transfer agent. Then bulk polymerization was conducted to manufacture a polymer for a core material of POFs. The obtained polymer had a Tg of 127° C. On the other hand, as a cladding material, a trifluoroethyl α-fluoroacrylate/methyl α-fluoroacrylate copolymer (molar ratio 85/15, index of refraction 1.397) was used. The polymers were subjected to fiber spinning by using a ram extruder type spinning machine comprising concentric double nozzle to manufacture a POF comprising a core/clad structure. It should be noted that temperature was 225° C. and pressure was in the range of 1.5 to 2.0 MPa during fiber spinning in the barrel and around the projected exit of the nozzle of the ram extruder type spinning machine to which the polymer for a core material was charged. Obtained POF had a diameter of 1 mm, a core diameter of 980 μm, and a clad thickness of 10 μm.

The resulting POF had transmission loss of 180 dB/km (measurement method; a 20 m$^{-5}$ m cutback method, wavelength; 650 nm, incident NA=0.1).

Exemplary Embodiments 13 to 22

Comparative Examples 12 to 14

POFs comprising core/clad structures were manufactured and measured in terms of transmission loss and thermal shrinkage as with Exemplary Embodiment 12 except that core materials and cladding materials comprising compositions shown in Table 3 were used. The results are shown in Table 3. It should be noted that a POF comprising a core material formed with PMMA was described in Comparative Example 14.

Exemplary Embodiments 23 to 26

Comparative Examples 15 to 18

POFs comprising core/clad structures were manufactured and measured in terms of transmission loss as with Exemplary Embodiment 12 except that core materials and cladding materials comprising compositions shown in Table 4 were used. Obtained evaluation results are summarized in Table 4.

Exemplary Embodiments 27 and 28

A polyamide 12 resin (manufactured by Daicel-Degussa, Ltd.; trade name: Diamide-L1640) was coated on the outer periphery of the POFs of Exemplary Embodiments 22 and 16 by using a coating die to manufacture POF cables with a diameter of 1.5 mm. Then initial transmission loss of the POF cables and transmission loss after the POF cables were subjected to heat treatment at 125° C. for 1000 hours were measured. Obtained results are shown in Table 5.

Exemplary Embodiments 29 to 32

POFs comprising core/first clad/second clad structures were manufactured by conducting fiber spinning by using a ram extruder type spinning machine comprising a concentric triple nozzle and measured in terms of transmission loss and thermal shrinkage as with Exemplary Embodiment 12 except that two cladding materials comprising compositions shown in Table 6 were used. The results are shown in Table 6. Each of obtained POFs had a diameter of 1 mm, and a core diameter of 960 μm. The first clad and the second clad were 10 μm thick respectively.

Exemplary Embodiment 33

A POF comprising a core/clad structure was manufactured as with Exemplary Embodiment 16 (core MMBL 25%, clad quaternary of 2F4F-6F-VE) except that temperature was 225° C. and pressure was in the range of 0.4 to 0.5 MPa during fiber spinning in the barrel and around the projected exit of the nozzle of the ram extruder type spinning machine to which the polymer for a core material was charged. Initial transmission loss was 1200 dB/km and thermal shrinkage was 0.8%.

Exemplary Embodiment 34

A mixture comprising 75 parts by mass of methyl methacrylate and 25 parts by mass of α-methylene-β-methyl-γ-butyrolactone (βMBL) (mass proportions of S to R were 50 to 50) was prepared. Then 0.3 parts by mass of dimethyl 2,2'-azobis-isobutyrate (V-601) as a polymerization initiator, and 0.3 parts by mass of n-butyl mercaptan as a chain transfer agent were added to the mixture. This stirred and dissolved mixture was charged into a glass ampoule and dissolved oxygen was removed by repeating freezing and devolatilization five times. After that, the mixture was subjected to heat treatment at 65° C. for 12 hours in an oil bath and subsequently at 120° C. for 5 hours to complete polymerization. The resulting copolymer composition had a polymer content of 97% and a total light scattering loss of 150 dB/km.

The copolymer composition was placed in a specific thermal compressor and subjected to thermal melting for 2 hours under conditions of a cylinder temperature of 210° C. and a load of 0.9 MPa. The resulting transparent polymer composition had a total light scattering loss of 45 dB/km. The copolymer composition had index of refraction of 1.500 and a glass transition temperature (Tg) of 149° C.

Comparative Example 19

Polymerization was conducted as with Exemplary Embodiment 34 except that 55 parts by mass of methyl methacrylate and 45 parts by mass of x-methylene-γ,γ-dimethyl-γ-butyrolactone (γDMBL). The resulting copolymer composition had a polymer content of 96% and a total light scattering loss equal to or more than 1000 dB/km. The polymer composition was subjected to thermal melting and turned opaque. The copolymer composition had a Tg of 148° C.

Comparative Example 20

Polymerization was conducted as with Exemplary Embodiment 34 except that 45 parts by mass of methyl methacrylate and 55 parts by mass of α-methylene-γ-methyl-γ- butyrolactone (γMBL) was used as monomers. The resulting resin composition was opaque. The composition had a rate of polymerization of 97%.

Exemplary Embodiment 35

Polymerization was conducted as with Exemplary Embodiment 34 except that 80 parts by mass of methyl methacrylate and 20 parts by mass of α-methylene-β-methyl-γ-methyl-γ-butyrolactone (βMγMBL) (mass proportions of S to R were 55 to 45) were used as monomers. The resulting copolymer composition had a polymer content of 97% and a total light scattering loss of 145 dB/km. Then the composition was subjected to thermal melting as with Exemplary Embodiment 34. The resulting copolymer composition had a total light scattering loss of 40 dB/km. The copolymer composition had index of refraction of 1.502 and a glass transition temperature (Tg) of 150° C.

Exemplary Embodiments 36 to 40

Comparative Example 21

Methyl methacrylate (MMA) and α-methylene-α-ethyl-γ-butyrolactone (βEBL) (mass proportions of S to R were 45 to 55) were mixed so that composition ratios shown in Table 7 were achieved, and polymerization was conducted as with Exemplary Embodiment 34. Then thermal melting as with Exemplary Embodiment 34 was conducted and physical properties of the obtained resin composition were measured. The results are shown in Table 7.

Exemplary Embodiments 41 to 43

Comparative Examples 22 and 23

Polymerization was conducted as with Exemplary Embodiment 34 except that 50% by mass of methyl methacrylate and 50 parts by mass of α-methylene-β-methyl-γ-butyrolactone (βMMBL) (mass proportions of S to R are shown in Table 8) were used as monomers. Then thermal melting as with Exemplary Embodiment 34 was conducted and physical properties of the obtained resin composition were measured. The results are shown in Table 8.

Exemplary Embodiments 44 to 46

Comparative Examples 24 and 25

Polymerization was conducted as with Exemplary Embodiment 34 except that 75 parts by mass of methyl methacrylate and 25 parts by mass of α-methylene-β-methyl-γ-butyrolactone (βMMBL) (mass proportions of S to R were 50 to 50) were used as monomers. The resulting copolymer composition had a polymer content of 97%, a glass transition temperature (Tg) of 150° C., and a total light scattering loss of 160 dB/km. Thermal melting was conducted according to conditions described in Table 9. The total light scattering loss of each of the resulting copolymer compositions is shown in Table 9.

As shown in Table 1, (co)polymers obtained in Exemplary Embodiment 1, Exemplary Embodiments 2 to 7 and Comparative Examples 1 to 7 had increased Tgs in comparison with polymethyl methacrylate (Tg=110° C.) and had good resistance to thermal decomposition. However, in the case of βMBL consisting of (R)-βMBL alone as shown in Comparative Examples 1 to 6, polymers had a lower light transmittance.

As shown in Table 2, the polymers having mixing proportions of (R)-ββMBL and (S)-βMMBL in the range of 30/70 to 70/30 had good light transmittance. On the other hand, the polymers having the mixing proportions out of the range had a lower light transmittance.

As shown in Exemplary Embodiments 12 to 22 in Table 3, POFs including core materials formed with polymers comprising a mixture including (R)-βMMBL and (S)-βMMBL in equal parts had good transmission characteristics and thermal shrinkage (only Exemplary Embodiments 14 to 22). However, transmission characteristics of POFs were deteriorated in Comparative Examples 12 and 13 in which polymers consisted of (R)-βMMBL alone in comparison with the case of Exemplary Embodiments 12 and 14 in which copolymers comprised the mixtures of (R)-βMMBL and (S)-βMMBL. POFs described in Exemplary Embodiments 12 and 13 and Comparative Example 14 shrank with curl on measurements of thermal shrinkage, and thus N/A.

As shown in Table 4, POFs including core materials formed with polymers having mixing proportions of (R)-βMMBL and (S)-βMMBL in the range of 30/70 to 70/30 had good initial transmission characteristics. On the other hand, POFs out of the range had considerably deteriorated transmission characteristics.

As shown in Table 5, POF cables in which a polyamide 12 resin was coated on the outer periphery of the POFs of Exemplary Embodiments 22 and 16 had good transmission characteristics.

TABLE 1

| | Composition of monomer feed (wt %) | | | Index of refraction | Tg (° C.) | Light transmittance (%) | Resistance to thermal decomposition | | | |
|---|---|---|---|---|---|---|---|---|---|---|
| | (R)-βMMBL | (S)-βMMBL | MMA | | | | 240° C. | 260° C. | 280° C. | 300° C. |
| Exemplary Embodiment 1 | 50 | 50 | 0 | 1.518 | >250° C. | 92 | good | good | good | fair |
| Exemplary Embodiment 2 | 5 | 5 | 90 | 1.495 | 128 | 92 | good | good | good | fair |
| Exemplary Embodiment 3 | 10 | 10 | 80 | 1.497 | 143 | 92 | good | good | good | fair |
| Exemplary Embodiment 4 | 15 | 15 | 70 | 1.500 | 159 | 92 | good | good | good | fair |
| Exemplary Embodiment 5 | 20 | 20 | 60 | 1.502 | 181 | 92 | good | good | good | fair |

TABLE 1-continued

| | Composition of monomer feed (wt %) | | | Index of refraction | Tg (° C.) | Light transmittance (%) | Resistance to thermal decomposition | | | |
|---|---|---|---|---|---|---|---|---|---|---|
| | (R)-βMMBL | (S)-βMMBL | MMA | | | | 240° C. | 260° C. | 280° C. | 300° C. |
| Exemplary Embodiment 6 | 25 | 25 | 50 | 1.505 | >250° C. | 92 | good | good | good | fair |
| Exemplary Embodiment 7 | 35 | 35 | 30 | 1.510 | >250° C. | 92 | good | good | good | fair |
| Comparative Example 1 | 10 | — | 90 | 1.495 | 127 | 90 | good | good | good | fair |
| Comparative Example 2 | 20 | — | 80 | 1.497 | 142 | 90 | good | good | good | fair |
| Comparative Example 3 | 30 | — | 70 | 1.500 | 165 | 89 | good | good | good | fair |
| Comparative Example 4 | 40 | — | 60 | 1.502 | 178 | 88 | good | good | good | fair |
| Comparative Example 5 | 50 | — | 50 | 1.505 | >250° C. | 50 | good | good | good | fair |
| Comparative Example 6 | 70 | — | 30 | 1.510 | >250° C. | Opaque | good | good | good | fair |
| Comparative Example 7 | 100 | — | 0 | 1.518 | >250° C. | Opaque | good | good | good | fair |

TABLE 2

| | Composition of monomer feed (wt %) | | | Light transmittance (%) |
|---|---|---|---|---|
| | (R)-βMMBL | (S)-βMMBL | MMA | |
| Comparative Example 8 | 25 | 75 | 0 | 30 |
| Exemplary Embodiment 8 | 35 | 65 | 0 | 92 |
| Exemplary Embodiment 9 | 65 | 35 | 0 | 92 |
| Comparative Example 9 | 75 | 25 | 0 | 30 |
| Comparative Example 10 | 6 | 19 | 75 | 50 |
| Exemplary Embodiment 10 | 9 | 16 | 75 | 92 |
| Exemplary Embodiment 11 | 16 | 9 | 75 | 92 |
| Comparative Example 11 | 19 | 6 | 75 | 50 |

TABLE 3

| | Core material | | | | | Cladding material | | Transmission loss | | Thermal shrinkage |
|---|---|---|---|---|---|---|---|---|---|---|
| | Composition of monomer feed (wt %) | | | Index of refraction | Tg (° C.) | Material composition (wt %) | Index of refraction | Initial (dB/km) | 125° C.* 1000 h (dB/km) | 125° C.* 24 h (%) |
| | (R)-βMMBL | (S)-βMMBL | MMA | | | | | | | |
| Exemplary Embodiment 12 | 5 | 5 | 90 | 1.495 | 128 | a3FA/aFMe (80/20) | 1.397 | 180 | — | N/A |
| Exemplary Embodiment 13 | 5 | 5 | 90 | 1.495 | 128 | VdF/TFE/HFP (48/43/9) | 1.374 | 185 | — | N/A |
| Exemplary Embodiment 14 | 12.5 | 12.5 | 75 | 1.499 | 149 | a3FA/aFMe (85/15) | 1.397 | 190 | 210 | 0.8 |
| Exemplary Embodiment 15 | 12.5 | 12.5 | 75 | 1.499 | 149 | VdF/TFE/HFP (48/43/9) | 1.374 | 195 | 220 | 0.8 |
| Exemplary Embodiment 16 | 12.5 | 12.5 | 75 | 1.499 | 149 | VdF/TFE/HFP/PFPVE (21/55/18/6) | 1.350 | 195 | 217 | 0.8 |
| Exemplary Embodiment 17 | 12.5 | 12.5 | 75 | 1.499 | 149 | VdF/TFE/HFP (40/40/20) | 1.365 | 194 | 221 | 0.8 |
| Exemplary Embodiment 18 | 12.5 | 12.5 | 75 | 1.499 | 149 | VdF/TFE (80/20) | 1.402 | 195 | 250 | 0.8 |
| Exemplary Embodiment 19 | 12.5 | 12.5 | 75 | 1.499 | 149 | 6FNPMA/MMA (80/20) | 1.412 | 190 | 210 | 0.8 |
| Exemplary Embodiment 20 | 12.5 | 12.5 | 75 | 1.499 | 149 | VdF/TFE/TFMVE/MAA (13/67/19/1) | 1.346 | 193 | 218 | 0.8 |

TABLE 3-continued

| | Core material | | | | | Cladding material | | Transmission loss | | Thermal shrinkage |
|---|---|---|---|---|---|---|---|---|---|---|
| | Composition of monomer feed (wt %) | | | Index of refraction | Tg | Material composition | Index of refraction | Initial | 125° C.* 1000 h | 125° C.* 24 h |
| | (R)-βMMBL | (S)-βMMBL | MMA | | (° C.) | (wt %) | | (dB/km) | (dB/km) | (%) |
| Exemplary Embodiment 21 | 25 | 25 | 50 | 1.505 | >250° C. | a3FA/aFMe (85/15) | 1.397 | 215 | 230 | <0.1 |
| Exemplary Embodiment 22 | 50 | 50 | 0 | 1.518 | >250° C. | a3FA/aFMe (85/15) | 1.397 | 230 | 243 | <0.1 |
| Comparative Example 12 | 10 | 0 | 90 | 1.495 | 127 | a3FA/aFMe (85/15) | 1.397 | 245 | 270 | N/A |
| Comparative Example 13 | 25 | 0 | 75 | 1.499 | 148 | a3FA/aFMe (85/15) | 1.397 | 260 | 280 | 0.8 |
| Comparative Example 14 | 0 | 0 | 100 | 1.492 | 110 | a3FA/aFMe (85/15) | 1.397 | 135 | — | N/A |

TABLE 4

| | Core material | | | | | Cladding material | | Transmission loss |
|---|---|---|---|---|---|---|---|---|
| | Composition of monomer feed (wt %) | | | Index of refraction | Tg (° C.) | Material composition (wt %) | Index of refraction | Initial (dB/km) |
| | (R)-βMMBL | (S)-βMMBL | MMA | | | | | |
| Comparative Example 15 | 25 | 75 | 0 | 1.518 | >250° C. | 6FNPMA/MMA (80/20) | 1.412 | N/A |
| Exemplary Embodiment 23 | 35 | 65 | 0 | 1.518 | >250° C. | 6FNPMA/MMA (80/20) | " | 240 |
| Exemplary Embodiment 24 | 65 | 35 | 0 | 1.518 | >250° C. | 6FNPMA/MMA (80/20) | " | 240 |
| Comparative Example 16 | 75 | 25 | 0 | 1.518 | >250° C. | 6FNPMA/MMA (80/20) | " | N/A |
| Comparative Example 17 | 6 | 19 | 75 | 1.499 | 148 | 6FNPMA/MMA (80/20) | " | N/A |
| Exemplary Embodiment 25 | 9 | 16 | 75 | 1.499 | 149 | 6FNPMA/MMA (80/20) | " | 215 |
| Exemplary Embodiment 26 | 16 | 9 | 75 | 1.499 | 149 | 6FNPMA/MMA (80/20) | " | 215 |
| Comparative Example 18 | 19 | 6 | 75 | 1.499 | 148 | 6FNPMA/MMA (80/20) | " | N/A |

TABLE 5

| | Optical fiber | Coating material | Transmission loss (dB/km) | |
|---|---|---|---|---|
| | | | Initial | 125° C.* 1000 h |
| Exemplary Embodiment 27 | Exemplary Embodiment 22 | PA12 | 235 | 250 |
| Exemplary Embodiment 28 | Exemplary Embodiment 16 | PA12 | 240 | 250 |

TABLE 6

| | Core material | | | | | Cladding material | | |
|---|---|---|---|---|---|---|---|---|
| | Composition of monomer feed (wt %) | | | Index of refraction | Tg (° C.) | Material composition (wt %) | Index of refraction | Tg (° C.) |
| | (R)-βMMBL | (S)-βMMBL | MMA | | | | | |
| Exemplary Embodiment 29 | 12.5 | 12.5 | 76 | 1.499 | 149 | β MMBL/3FM/17FM/MMA (30/29/40/1) | 1.43 | 140 |

TABLE 6-continued

| | | | | | | | |
|---|---|---|---|---|---|---|---|
| Exemplary Embodiment 30 | 12.5 | 12.5 | 75 | 1.499 | 149 | β MMBL/4FM/17FM/MMA (20/39/40/1) | 1.426 | 124 |
| Exemplary Embodiment 31 | 12.5 | 12.5 | 75 | 1.499 | 149 | β MMBL/8FM/MMA (29/70/1) | 1.436 | 118 |
| Exemplary Embodiment 32 | 12.5 | 12.5 | 75 | 1.499 | 149 | β MMBL/4FM/6FM/MMA (20/40/39/1) | 1.436 | 110 |

| | Cladding material | | Transmission loss | | Thermal shrinkage |
|---|---|---|---|---|---|
| | Material composition (wt %) | Index of refraction | Initial (dB/km) | 125° C.*1000 h (dB/km) | 125° C.*24 h (%) |
| Exemplary Embodiment 29 | VdF/TFE/HFP/PFPVE (21/55/18/6) | 1.350 | 180 | 200 | 0.8 |
| Exemplary Embodiment 30 | VdF/TFE/HFP/PFPVE (21/55/18/6) | 1.350 | 182 | 207 | 0.8 |
| Exemplary Embodiment 31 | VdF/TFE/HFP/PFPVE (21/55/18/8) | 1.350 | 181 | 209 | 0.8 |
| Exemplary Embodiment 32 | VdF/TFE/HFP/PFPVE (21/55/18/8) | 1.350 | 184 | 214 | 0.8 |

*isomeric (R)/(S) ratio for βMMBL used for the cladding material: (R)/(S) = 50/50

TABLE 7

| Exemplary Embodiments | Composition ratio (mass %) | | Index of refraction | Tg (° C.) | Total light scattering loss (dB/km) | |
|---|---|---|---|---|---|---|
| | MMA | βEBL | | | before heat treatment | after heat treatment |
| Exemplary Embodiment 36 | 0 | 100 | 1.522 | >250 | 146 | 48 |
| Exemplary Embodiment 37 | 25 | 75 | 1.515 | >250 | 220 | 70 |
| Exemplary Embodiment 38 | 50 | 50 | 1.507 | 200 | 162 | 55 |
| Exemplary Embodiment 39 | 60 | 30 | 1.501 | 165 | 135 | 41 |
| Exemplary Embodiment 40 | 90 | 10 | 1.495 | 130 | 81 | 25 |
| Comparative Example 21 | 100 | 0 | 1.492 | 115 | 37 | 12 |

TABLE 8

| Exemplary Embodiments | Composition ratio (mass %) | | Index of refraction | Tg (° C.) | Total light scattering loss (dB/km) | |
|---|---|---|---|---|---|---|
| | (S) | (R) | | | before heat treatment | after heat treatment |
| Comparative Example 22 | 20 | 80 | 1.507 | 201 | >1000 | 420 |
| Exemplary Embodiment 41 | 30 | 70 | 1.507 | 201 | 298 | 95 |
| Exemplary Embodiment 42 | 50 | 50 | 1.507 | 202 | 140 | 45 |

TABLE 8-continued

| Exemplary Embodiments | Composition ratio (mass %) (S) | (R) | Index of refraction | Tg (°C.) | Total light scattering loss (dB/km) before heat treatment | after heat treatment |
|---|---|---|---|---|---|---|
| Exemplary Embodiment 43 | 70 | 30 | 1.507 | 200 | 305 | 92 |
| Comparative Example 23 | 80 | 20 | 1.507 | 201 | >1000 | 400 |

TABLE 9

| Exemplary Embodiments | Tg (°C.) | Thermal melting Temperature (°C.) | Pressure (MPa) | Total light scattering loss (dB/km) before heat treatment | after heat treatment |
|---|---|---|---|---|---|
| Comparative Example 24 | 150 | 185 | 1.0 | 160 | 135 |
| Exemplary Embodiment 44 | 150 | 195 | 1.0 | 160 | 95 |
| Exemplary Embodiment 45 | 150 | 210 | 0.7 | 160 | 50 |
| Exemplary Embodiment 46 | 150 | 220 | 1.2 | 160 | 41 |
| Comparative Example 25 | 150 | 210 | 0.5 | 160 | N/A due to foaming |

INDUSTRIAL APPLICABILITY

Polymers excellent in heat resistance and transparency and having a total light scattering loss of not more than 100 dB/km can be obtained. Use of the polymers as core material provides plastic optical fibers and plastic optical fiber cables that can achieve transmission loss equal to or less than 400 dB/km. And thus the plastic optical fibers and plastic optical fiber cables can be applied not only to information transmission such as communication wirings in automobiles, but also various optical parts that requires heat resistance as well as high level of transparency and extremely low light scattering loss such as gradient index lenses, optical waveguides, or optical devices in the optoelectronics field.

The invention claimed is:

1. A polymer composition comprising 5 to 100% by mass of a unit (A) of a lactone compound represented by a general formula (1) and 0 to 95% by mass of a unit (B) of (meth) acrylate as constitutional units, wherein the unit (A) of lactone compound comprises a unit of an (S) isomer represented by a general formula (2) and a unit of an (R) isomer represented by a general formula (3) at a mass ratio of from 70/30 to 30/70, and wherein the polymer composition has a total light scattering loss of not more than 100 dB/km,

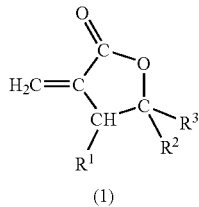
(Formula 1)

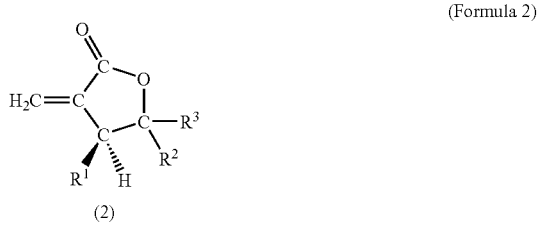
(Formula 2)

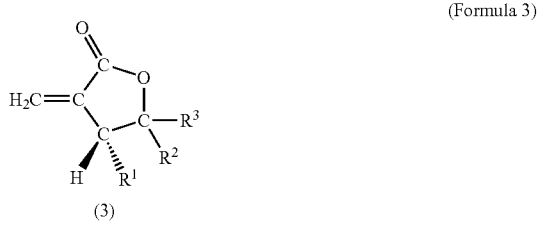
(Formula 3)

wherein, in the formulae (1) to (3), $R^1$ represents a methyl group, an ethyl group, or a propyl group; and $R^2$ and $R^3$ independently represent a hydrogen atom, a $C_{1-12}$ alkyl group that may be unsubstituted or substituted with one or more than two fluorine atoms, a phenyl group that may be unsubstituted or substituted with one or more than two alkyl groups, or a cyclohexyl group that may be unsubstituted or substituted with one or more than two fluorine atoms, or alternatively $R^2$ and $R^3$ may unite each other to form a 5- or 6-membered ring including the carbon atom to which $R^2$ and $R^3$ are bonded, where the 5- or 6-membered ring may be substituted with one or more than two fluorine atoms.

2. The polymer composition according to claim 1, wherein the unit (B) of (meth)acrylate comprises a unit of methyl methacrylate.

3. A plastic optical fiber characterized in that the fiber has a transmission loss of not more than 400 dB/km and a core of a polymer composition comprising 5 to 100% by mass of a unit (A) of a lactone compound represented by a general formula (1) and 0 to 95% by mass of a unit (B) of (meth) acrylate as constitutional units, wherein the unit (A) of a lactone compound comprises a unit of an (S) isomer represented by a general formula (2) and a unit of an (R) isomer represented by a general formula (3) at a mass ratio of from 70/30 to 30/70,

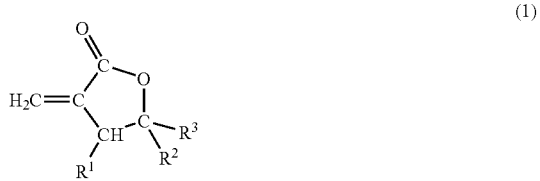
(1)

-continued

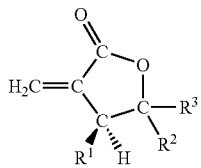
(2)

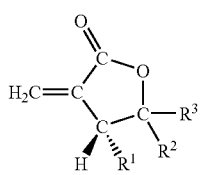
(3)

wherein, in the formulae (1) to (3), $R^1$ represents a methyl group, an ethyl group, or a propyl group; and $R^2$ and $R^3$ independently represent a hydrogen atom, a $C_{1-12}$ alkyl group that may be unsubstituted or substituted with one or more than two fluorine atoms, a phenyl group that may be unsubstituted or substituted with one or more than two alkyl groups, or a cyclohexyl group that may be unsubstituted or substituted with one or more than two fluorine atoms, or alternatively $R^2$ and $R^3$ may unite each other to form a 5- or 6-membered ring including the carbon atom to which $R^2$ and $R^3$ are bonded, where the 5- or 6-membered ring may be substituted with one or more than two fluorine atoms.

4. The plastic optical fiber according to claim 3, characterized in that the unit (B) of (meth)acrylate comprises a unit of methyl methacrylate.

5. The plastic optical fiber according to claim 3, characterized in that a clad comprises a fluorine-containing olefin resin comprising a tetrafluoroethylene unit with heat of crystal fusion equal to or less than 40 mJ/mg.

6. The plastic optical fiber according to claim 3, characterized in that the plastic optical fiber has a clad comprising one or more layers, and an innermost layer thereof comprises a copolymer comprising 15 to 90% by mass of a unit (C) of fluoroalkyl (meth)acrylate represented by a general formula (8), $$CH_2=CX-COO(CH_2)m-R1f \quad (8)$$

wherein X represents a hydrogen atom, a fluorine atom, or a methyl group; R1f represents a $C_{1-12}$ (fluoro)alkyl group; and m represents an integer of 1 or 2, and
10 to 85% by mass of a unit (A) of a lactone compound represented by the general formula (1) comprising a unit of an (S) isomer represented by the general formula (2) and a unit of an (R) isomer represented by the general formula (3) at a mass ratio of from 70/30 to 30/70.

7. A plastic optical fiber cable, characterized by comprising a coating layer comprising a thermoplastic resin on the outer periphery of the plastic optical fiber according to claim 3.

8. A method for manufacturing a polymer composition characterized by polymerizing a mixture of monomers comprising 5 to 100% by mass of a lactone compound (A) represented by a general formula (1) comprising an (S) isomer represented by a general formula (2) and an (R) isomer represented by a general formula (3) at a mass ratio of from 70/30 to 30/70, and 0 to 95% by mass of a (meth)acrylate (B) so that the mixture has a polymer content equal to or greater than 94%; and then subjecting the mixture to thermal melting under conditions of a temperature of Tc° C. (Tc≧Tg+40) (Tg denotes a glass transition temperature of the polymer composition) and of a pressure equal to or greater than 0.6 MPa,

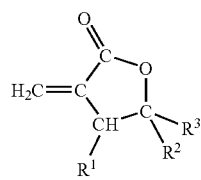
(1)

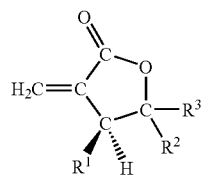
(2)

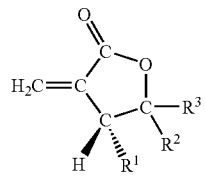
(3)

wherein, in the formulae (1) to (3), $R^1$ represents a methyl group, an ethyl group, or a propyl group; and $R^2$ and $R^3$ independently represent a hydrogen atom, a $C_{1-12}$ alkyl group that may be unsubstituted or substituted with one or more than two fluorine atoms, a phenyl group that may be unsubstituted or substituted with one or more than two alkyl groups, or a cyclohexyl group that may be unsubstituted or substituted with one or more than two fluorine atoms, or alternatively $R^2$ and $R^3$ may unite each other to form a 5- or 6-membered ring including the carbon atom to which $R^2$ and $R^3$ are bonded, where the 5- or 6-membered ring may be substituted with one or more than two fluorine atoms.

9. A method for manufacturing a plastic optical fiber characterized by subjecting a core to thermal melting under conditions of a temperature of Tc° C. (Tc≧Tg+40) (Tg denotes a glass transition temperature of a polymer composition) and of a pressure equal to or greater than 0.6 MPa wherein the core is formed of a polymer composition obtained by polymerizing a mixture of monomers comprising 5 to 100% by mass of a unit (A) of a lactone compound represented by a general formula (1) comprising a unit of an (S) isomer represented by a general formula (2) and a unit of an (R) isomer represented by a general formula (3) at a mass ratio of from 70/30 to 30/70, and 0 to 95% by mass of a unit (B) of (meth)acrylate so that the mixture has a polymer content equal to or greater than 94%.

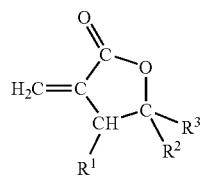
(1)

-continued

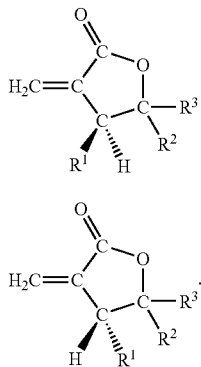

10. The plastic optical fiber according to claim 4, characterized in that a clad comprises a fluorine-containing olefin resin comprising a tetrafluoroethylene unit with heat of crystal fusion equal to or less than 40 mJ/mg.

11. The plastic optical fiber according to claim 4, characterized in that the plastic optical fiber has a clad comprising one or more layers, and an innermost layer thereof comprises a copolymer comprising 15 to 90% by mass of a unit (C) of fluoroalkyl (meth)acrylate represented by a general formula (8).

wherein X represents a hydrogen atom, a fluorine atom, or a methyl group; R1f represents a $C_{1-12}$ (fluoro)alkyl group; and m represents an integer of 1 or 2, and 10 to 85% by mass of a unit (A) of a lactone compound represented by the general formula (1) comprising a unit of an (S) isomer represented by the general formula (2) and a unit of an (R) isomer represented by the general formula (3) at a mass ratio of from 70/30 to 30/70.

12. A plastic optical fiber cable, characterized by comprising a coating layer comprising a thermoplastic resin on the outer periphery of the plastic optical fiber according to claim 4.

13. A plastic optical fiber cable, characterized by comprising a coating layer comprising a thermoplastic resin on the outer periphery of the plastic optical fiber according to claim 5.

14. A plastic optical fiber cable, characterized by comprising a coating layer comprising a thermoplastic resin on the outer periphery of the plastic optical fiber according to claim 6.

* * * * *